United States Patent [19]

Suzuki

[11] Patent Number: 5,742,928
[45] Date of Patent: Apr. 21, 1998

[54] APPARATUS AND METHOD FOR SPEECH RECOGNITION IN THE PRESENCE OF UNNATURAL SPEECH EFFECTS

[75] Inventor: Tadashi Suzuki, Tokyo, Japan

[73] Assignee: Mitsubishi Denki Kabushiki Kaisha, Tokyo, Japan

[21] Appl. No.: 548,702

[22] Filed: Oct. 26, 1995

[30] Foreign Application Priority Data

Oct. 28, 1994 [JP] Japan .................................... 6-265280

[51] Int. Cl.⁶ ........................................................ G10L 9/06
[52] U.S. Cl. ........................ 704/239; 704/225; 704/226; 704/233; 704/256
[58] Field of Search ................................ 395/2.34, 2.35, 395/2.42, 2.45, 2.51, 2.59, 2.65, 2.47–2.5, 2.53

[56] References Cited

U.S. PATENT DOCUMENTS

| | | | |
|---|---|---|---|
| 5,313,555 | 5/1994 | Kamiya | 395/2.42 |
| 5,361,324 | 11/1994 | Takizawa et al. | 395/2.42 |
| 5,579,436 | 11/1996 | Chou et al. | 395/2.53 |

OTHER PUBLICATIONS

Junqua et al."Acoustic and Perceptual Studies of Lombard Speech: Application to Isolated Words Automatic Speech Recognition." ICASSP '90: Acoustics, Speech Signal Processing Conference, 1990.

Hansen, J. "Morphological Constrained Feature Enhancement with Adaptive Cepstral Compensation (MCE-ACC) for Speech Recognition in Noise and Lombard Effect." IEEE Transactions on Speech and Audio Processing, vol. 2, No. 4, Oct. 1994.

Junqua, J. "The Influence of Psychoacoustic and Psycholinguistic factors on Listner Judgments of Intelligibility of Normal and Lombard Speech." ICASSP '91: Acoustics, Speech & Signal Processing Conference, 1991.

Hanson, B. et al. "Robust Speaker–Independent Word Recognition Using Static, Dynamic Acceleration Features: Experiments with Lombard and Noisy Speech." ICASSP '90: Acoustics, Speech & Signal Processing Conference, 1990.

ICSLP 94 "Isolated Word Recognition Using Models for Acoustic Phonetic Variability by Lombard Effect" Suzuki, Nakajima & Abe, Computer & Information Systems Lab., Mitsubishi Electric –Japan.

*Primary Examiner*—Allen R. MacDonald
*Assistant Examiner*—Alphonso A. Collins
*Attorney, Agent, or Firm*—Wolf, Greenfield & Sacks, P.C.

[57] ABSTRACT

A speech recognition apparatus recognizes utterances of unnatural speech having a higher performance of recognition accuracy with a smaller amount of speech learning data. The speech recognition apparatus includes an acoustic-phonetic variability learn unit, a normal speech model memory, a spectrum smooth-modifier and a speech recognizer. An input speech signal is acoustically analyzed and transformed into a time-series feature vector. The acoustic-phonetic variability learn unit learns an acoustic-phonetic change of spectrum caused by unnatural speech and generates a plurality of acoustic-phonetic variability models. The normal speech model memory stores a normal speech model learned based on normal speech data. The spectrum smooth-modifier modifies the normal speech model based on a plurality of the acoustic-phonetic variability model and generates a plurality of spectrum-modified speech models. The speech recognizer recognizes the time-series feature vector based on the normal speech model and the spectrum-modified speech model.

40 Claims, 24 Drawing Sheets

Fig. 4
| No. | MEAN VECTOR (HMM) | |
|---|---|---|
| | NORMAL SPEECH MODELS | |
| 1 |  | X1 |
| 2 |  | X2 |
| 3 | 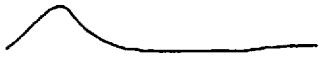 | X3 |
| 4 |  | X4 |
| ⋮ | ⋮ | |
| i |  | Xi |
| ⋮ | ⋮ | |
| 299 |  | X299 |
| 300 |  | X300 |

Fig. 5

| ACOUSTIC - PHONETIC VARIABILITY MODELS ||
|---|---|
| No. | PARAMETERS |
| 1 | H1,T1,Q1 |
| 2 | H2,T2,Q2 |
| 3 | |
| 4 | H4,T4,Q 4 |
| ⋮ | ⋮ |
| i | Hi, Ti , Qi |
| ⋮ | ⋮ |
| 299 | |
| 300 | H300,T300,Q300 |

Fig. 7

| i \ j | 1 | 2 | 3 | --- | j | --- | 300 |
|---|---|---|---|---|---|---|---|
| 1 | 1.0 | 0.9 | 0.5 | --- | 0.8 | --- | --- |
| 2 | 0.5 | 1.0 | 0.8 | --- | --- | --- | --- |
| 3 | 0.9 | 0.8 | 1.0 | --- | 0.7 | --- | 0.1 |
| ⋮ | ⋮ | ⋮ | ⋮ | 1.0 | --- | --- | --- |
| i | 0.8 | 0.7 | ⋮ | ⋮ | 1.0 | | --- |
| ⋮ | ⋮ | ⋮ | ⋮ | ⋮ | ⋮ | 1.0 | --- |
| 300 | ⋮ | 1.0 | ⋮ | ⋮ | ⋮ | ⋮ | 1.0 |

Fig. 15

| No. | MEAN VECTOR (HMM) | DURATION PARAMETER | |
|---|---|---|---|
| | | AVERAGE | DISTRIBUTION |
| 1 | X1 | N1 | $\sigma 1$ |
| 2 | X2 | N2 | $\sigma 2$ |
| 3 | X3 | N3 | $\sigma 3$ |
| 4 | X4 | N4 | $\sigma 4$ |
| ⋮ | ⋮ | ⋮ | ⋮ |
| i | Xi | Ni | $\sigma i$ |
| ⋮ | ⋮ | ⋮ | ⋮ |
| 299 | X299 | N299 | $\sigma 299$ |
| 300 | X300 | N300 | $\sigma 300$ |

(Table header: NORMAL SPEECH MODELS)

Fig. 16

| DURATION CHANGE DATA | | | |
|---|---|---|---|
| No. | SUB-PHONEME | Δ AVERAGE | Δ DISTRIBUTION |
| 1 | /a/ | Δ N1 | Δ σ1 |
| 2 | /i/ | Δ N2 | Δ σ2 |
| 3 | /u/ | Δ N3 | Δ σ3 |
| 4 | /e/ | Δ N4 | Δ σ4 |
| 5 | /o/ | Δ N5 | Δ σ5 |
| 6 | /k/ | Δ N6 | Δ σ6 |
| ⋮ | ⋮ | ⋮ | ⋮ |
| 300 | /t/ | Δ N300 | Δ σ300 |

70: SPECTRAL ENVELOPE

231: NON - LINEAR FREQUENCY WARPING FUNCTION BASED UPON FORMANT SHIFT PARAMETER "H"

232: WARPED SPECTRAL ENVELOPE

1

APPARATUS AND METHOD FOR SPEECH RECOGNITION IN THE PRESENCE OF UNNATURAL SPEECH EFFECTS

BACKGROUND OF THE INVENTION

1. Field of the Invention

The present invention relates to speech recognition and more specifically to a speech recognition apparatus for recognizing speech with acoustic phonetic changes caused by Lombard speech including unnatural utterance of speakers such as a loud-voice speech in background noise, any forms of speech uttered in an unnatural environment and speech by the disabled.

2. Description of the Conventional Art

The acoustic phonetic changes of phonemes caused by unnatural speech in background noise may be referred to as Lombard speech. Lombard speech presents many challenges for speech recognition, as well as having a degrading mixed-noise effect on speech signals. In view of such a problematic Lombard speech recognition, some compensation methods have been developed for spectral changes of phonemes by Lombard effect based on a speaker-independent or phoneme-independent recognition.

"Speech Recognition Apparatus" disclosed in Japanese Unexamined Patent Publication No. HEI4-296799 and "Speech Recognition Apparatus" disclosed in Japanese Unexamined Patent Publication No. HEI5-6196 describe a compensation method for spectral changes of phonemes by Lombard effect using cepstrum parametric modification in the light of a great formant shift of spectrum in a frequency range of 150 Hz and 300 Hz. The cepstrum parametric modification is based on a formant frequency analysis of input utterance and frequency change data of utterance prescribed by the degree of background noise or speaker's vocal effort.

"Lombard Speech Recognition Method" disclosed in Japanese Unexamined Patent Publication No. HEI4-257898 describes another compensation method for Lombard speech recognition based on a Dynamic Programming matching method also in view of the great formant shift of spectrum in the same frequency range as above. The Dynamic Programming DP matching compensates a matching difference, when it is below 1.5 kHz, between a spectrum of a standard pattern and that of an input pattern.

These compensation methods, however, fail to achieve a satisfactory performance of Lombard speech recognition when a larger amount of vocabulary words is provided for recognition. The conventional speaker-independent and phoneme-independent speech recognition methods leave aside a significant aspect of Lombard speech, which depends greatly on speakers and phonemes of spectral changes by Lombard effect. The spectrum modification is never successful for compensating spectral changes in the other frequency ranges than that of 150 Hz and 300 Hz.

Lombard speech has another considerable property—the prolongation of word duration of utterance. A conventional speech recognition method with a normal duration control method on a phonological unit basis, such as sub-phoneme, phoneme, syllable, etc., may easily degrade the performance of Lombard speech recognition.

In view of the problematic properties of Lombard speech, here are some improved methods proposed for Lombard speech recognition. *A Study for Word Recognition using a Variation Model of the Lombard effect* by Tadashi SUZUKI, Kunio NAKAJIMA, Yoshiharu ABE (MITSUBISHI Elect. Corp.), abstract of paper read at Japan Acoustic Society Study Meeting, autumn 1993, discloses a new improved method for Lombard speech recognition. According to this method, acoustic-phonetic variability models or parametric representations of Lombard speech are defined on a phoneme basis for spectral changes by Lombard effect. The parametric representations of the acoustic-phonetic variability model are learned based on a mass of Lombard speech data on a phoneme basis and used for Lombard speech recognition.

*A Study for Lombard Speech Recognition* by Tadashi SUZUKI, Kunio NAKAJIMA (MITSUBISHI Elect. Corp.), abstract of paper read at Japan Acoustic Society Study Meeting, spring 1994, discloses a further study of Lombard speech recognition. According to this method, the duration changes by Lombard effect are further compensated on a sub-phoneme basis. The duration changes by Lombard effect are compensated by modifying duration parameters of sub-phoneme HMMs Hidden Markov Models based on mean values and standard deviations of the average ratio of a plurality of speakers.

The previous improved method of conventional Lombard speech recognition is now discussed in detail with reference to FIGS. 17 through 25. FIG. 17 is a block diagram of a speech recognition apparatus where the conventional method for Lombard speech recognition may be implemented. Referring to FIG. 17, speech signals of utterance captured at a speech data entry 1 are preprocessed in an acoustic analyzer 2 to extract a time-series feature vector 3. The time-series feature vector 3 is transferred to an acoustic-phonetic variability learn unit 5 via a learn mode switch 4a in a transfer switch 4 in a learn mode of operation and transferred to a speech recognizer 12 via a recognize mode switch 4b in the transfer switch 4 in a recognize mode of operation. The acoustic-phonetic variability learn unit 5 learns and generates an acoustic-phonetic variability model 8 based on the time-series feature vector 3 and a normal speech model 7 stored in a normal speech model memory 6. The acoustic-phonetic variability model 8 is transferred to an acoustic-phonetic variability model memory 9 to be stored. The normal speech model memory 6 stores the normal speech model, including duration parameters, which is described in more detail below.

A duration memory 10 stores average duration change data of acoustic phonetic changes by Lombard effect in a preliminary separate operation. The average duration change data are the average values of the mean values and standard deviations of duration changes calculated based on the ratio of normal speech to Lombard speech of a plurality of speakers using alignments of sub-phoneme or phoneme HMMs on normal speech and Lombard speech. A duration parameter modifier 11 modifies the duration parameters of the normal speech model 7 using the duration change data stored in the duration memory 10. The speech recognizer 12 recognizes the time-series feature vectors 3 of an input word of utterance using the acoustic-phonetic variability models 8 from the acoustic-phonetic variability model memory 9 and the normal speech models 7 with the duration parameters modified in the duration parameter modifier 11.

FIG. 18 is a detailed block diagram of acoustic-phonetic variability learn unit 5 of FIG. 17 illustrating a learning loop. The learning loop includes: a reference speech model buffer 14 for buffering a reference speech model 7a; a segmenter 15 for segmenting the time-series feature vector 3 into an optimal segment data 7b based on the reference speech model 7a; a parametric calculator 16 for calculating parametric representations 7c of the acoustic-phonetic variability model 8 of the time-series feature vector 3 based on the segment data 7b, the normal speech model 7 and the reference speech model 7a; an acoustic-phonetic variability model buffer 17 for buffering the parametric representations 7c of the acoustic-phonetic variability model 8; and a spectrum modifier 18a for modifying the normal speech model 7 based on the acoustic-phonetic variability model 8 and consequently updating the reference speech model 7a in the reference speech model buffer 14 with the spectrum-modified normal speech model.

A discrete word recognition of Lombard speech according to the conventional speech recognition apparatus is now discussed based on continuous density sub-phoneme HMM. The normal speech model memory 6 stores the normal speech models 7 representing sub-phoneme HMMs and word models, each in a string of sub-phoneme HMMs, representing vocabulary words for recognition. The normal speech model 7 includes a sub-phoneme learned in a preliminary learn operation based on normal speech data and normal duration parameters of average values and distribution values of sub-phoneme HMMs duration.

If an input word of utterance in the speech data entry 1 is categorical for learning, the input word of utterance is transferred to a learn process via the learn mode switch 4a, and if not, it is transferred straight to a recognition process via the recognize mode switch 4b.

The learn mode of operation is now discussed with reference to FIGS. 17 through 19. FIG. 19 is a flowchart illustrating a series of operating steps of learning and generating the acoustic-phonetic variability model 8 in the acoustic-phonetic variability learn unit 5.

A categorical word of utterance captured at the speech data entry 1 is transformed into the time-series feature vector 3 based on an acoustic analysis in the acoustic analyzer 2 and transferred to the acoustic-phonetic variability learn unit 5 via the learn mode switch 4a in the transfer switch 4.

A learn mode of operation including the learning loop for learning and generating the acoustic-phonetic variability model 8 in the acoustic-phonetic variability learn unit 5 of FIG. 18 is now discussed with reference to the flowchart of FIG. 19.

Step S1

A loop counter is set to an initial value zero for initialization of a series of learning loop operations.

Step S2

The reference speech model buffer 14 is loaded with the normal speech model 7 as the initial reference speech model 7a from the normal speech model memory 6 only when the loop counter indicates zero.

Step S3

The input time-series feature vectors 3 of a categorical word of utterance are calculated with the reference speech models 7a from the reference speech model buffer 14 to extract sub-phoneme based segment data 7b in the segmenter 15. The segment calculation is based on a Viterbi-path algorithm with word models of the same category.

Step S4

The parametric calculation in the parametric calculator 16 is based on the sub-phoneme based segment data 7b calculating a difference of the spectrum envelopes of the mean vectors of the normal speech model sub-phoneme HMM, of the reference speech model sub-phoneme HMM and of the segment data 7b extracted from the time-series feature vector 3. Calculated parameters representing the acoustic-phonetic variability model 8 are buffered in the acoustic-phonetic variability model buffer 17.

Step S5

The loop counter is incremented by one each series of the learning loop operations until the incremented number reaches a predetermined maximum repeating number of the learning loop operation.

Step S6

An incremented number of the loop counter is compared to the predetermined maximum number.

When the incremented number is less than the predetermined maximum number, the operation proceeds to Step S7 for further learning in the learning loop.

When the incremented number meets the predetermined maximum number, a series of learning operations terminates. The learned acoustic-phonetic variability model 8 is output from the acoustic-phonetic variability learn unit 5 and stored in the acoustic-phonetic variability model memory 9.

Step S7

The mean vector of the normal speech model 7 is modified in the spectrum modifier 18a based on the acoustic-phonetic variability model 8 from the acoustic-phonetic variability model buffer 17. The modified mean vector of the normal speech model 7 updates the reference speech model 7a in the reference speech model buffer 14. The operation then proceeds to Step S3 to repeat the learning and generating operation in the loop.

Referring further to the parametric calculation of Step S4, the spectrum envelope of the mean vector of the initial reference speech model sub-phoneme HMM in the reference speech model buffer 14 is equivalent to that of the normal speech model sub-phoneme HMM when the loop counter is zero. In the initial loop operation, therefore, the parametric calculator 15 calculates a difference between the spectrum envelopes of the time-series feature vector 3 of Lombard speech and of the normal speech model 7 based on normal speech using the parametric representations of the acoustic-phonetic variability model 8. FIG. 20 shows a difference between spectral envelopes 30 and 70, respectively, of the time-series feature vector 3 and the normal speech model sub-phoneme HMM. The acoustic-phonetic variability model 8 is comprised of the parameters of three factors, for example, frequency formant shift (1), spectral tilt change (2), and frequency bandwidth change (3), representing the change in spectral envelope by Lombard effect. FIG. 21 illustrates a parametric calculation of the three factors in the parametric calculator 16 based on the difference between the spectrum envelopes 30 and 70 of FIG. 20. Referring to FIG. 21, frequency formant shift (1) is represented by a non-linear frequency warping function. Parameter H, obtained by means of a DP matching between the spectrum envelopes 30 and 70. The spectrum envelope 70 is modified by the non-linear frequency warping function, Parameter H, to calculate a pseudo spectrum envelope of the spectrum envelope 30. A mean spectral difference is then calculated based on a difference between the pseudo spectrum envelope of the spectrum envelope 30 and the spectrum envelope 70. Spectral tilt change (2), Parameter T, and frequency bandwidth change (3), Parameter Q, are calculated based on the mean spectral difference. The acoustic-phonetic variability model buffer 17 buffers a set of three parameters of Parameter H, Parameter T and Parameter Q as the acoustic-phonetic variability model 8.

Referring further to the spectrum modification of Step S7, the spectral envelope 70 of the normal speech model sub-phoneme HMM is modified in the spectral modifier 18a based on the three parameters in the manner illustrated in FIGS. 22 through 24. FIG. 22 illustrates the spectral envelope 70 being modified based on Parameter H of the non-linear frequency warping function 231 for compensating for the formant shift to generate warped spectral envelope 232. FIG. 23 illustrates the spectral envelope 70 being modified by mixer 242 based on element 241, log-power spectrum of spectral tilt change filter based upon spectral tilt change Parameter T, for compensating the spectral tilt change. FIG. 24 illustrates the spectral envelope 70 being modified by mixer 252 based on peak enhancement based upon bandwidth change Parameter Q 251 for compensating the bandwidth change. The normal speech model sub-phoneme HMM thus modified based on the acoustic-phonetic variability model 8 replaces the reference speech model 7a buffered in the reference model buffer 14 for updating. Repeating of such a spectrum modification of the normal speech model sub-phoneme HMM in the learning loop can accomplish the acoustic-phonetic variability model 8 of higher quality for recognition accuracy.

A recognize mode of operation of is now discussed with reference to FIGS. 17 and 25. FIG. 25 is a detailed block diagram of the speech recognizer 12 of FIG. 17. Referring to FIG. 25, a spectrum modifier 18b modifies all the normal speech model sub-phoneme HMMs stored in the normal speech model memory 6 and transferred via the duration parameter modifier 11 using the corresponding acoustic-phonetic variability models 8 stored in the acoustic-phonetic variability model memory 9 on a sub-phoneme basis. A speech model synthesizer 19 synthesizes two inputs of the modified normal speech model sub-phoneme HMMs from the spectrum modifier 18b and the normal speech model sub-phoneme HMMs from the duration parameter modifier 11 on a sub-phoneme basis. A similarity calculator 20 calculates similarity of the time-series feature vector 3 to each of all of synthesized speech model sub-phoneme HMMs from the speech model synthesizer 19. An identifier 21 inputs word models stored in the normal speech model memory 6 and similarity data from the similarity calculator 20 to identify the time-series feature vectors 3 of an input word of utterance. An identified category of word model is output from the identifier 21 or the speech recognizer 12 as a recognition result 13.

The duration parameter modifier 11 modifies the duration parameters of the normal speech model sub-phoneme HMM based on sub-phoneme based duration change data stored in the duration memory 10.

A non-categorical word of utterance captured at the acoustic analyzer 2 is transformed into the time-series feature vector 3 based on an acoustic analysis in the acoustic analyzer 2 and transferred directly to the speech recognizer 12 via the recognize mode switch 4b in the transfer switch 4.

Referring further to FIG. 25, the spectrum modifier 18b performs a spectrum modification equivalent to that of the spectrum modifier 18a in the acoustic-phonetic variability learn unit 5 discussed earlier with reference to FIGS. 21 through 24. The spectrum modifier 18b inputs the normal speech model sub-phoneme HMMs stored in the normal speech model memory 6 via the duration parameter modifier 11 and the corresponding acoustic-phonetic variability models 8 from the acoustic-phonetic variability model memory 9. The spectrum envelope of the normal speech model sub-phoneme HMM is modified based on the corresponding acoustic-phonetic variability model 8 by means of the three different parametric modifications by Parameters H, T and Q, illustrated in FIGS. 22 through 24. A modified spectrum envelope based on the acoustic-phonetic variability model 8 is output to the speech model synthesizer 19.

Thus, according to the conventional spectrum modification of the spectrum modifier 18b, a sub-phoneme HMM is modified based on the corresponding acoustic-phonetic variability model 8 as a learning result from Lombard speech. Therefore, a sub-phoneme HMM having no corresponding acoustic-phonetic variability model 8 available in the memory cannot be modified.

The speech model synthesizer 19 synthesizes two speech models having the same probability of divergence and generates synthesized continuous density sub-phoneme HMMs including the normal speech model sub-phoneme HMMs via the duration parameter modifier 11 and the spectrum-modified normal speech model sub-phonemes HMM from the spectrum modifier 18b. The similarity calculator 20 calculates a similarity of the time-series feature vectors 3 to the synthesized continuous density sub-phoneme HMMs from the speech model synthesizer 19. The identifier 21 calculates a word similarity between similarity data from the similarity calculator 20 and each word model in a string of sub-phoneme HMMs representing a vocabulary word for recognition stored in the normal speech model memory 6 based on a Viterbi algorithm or Trellis algorithm. A word model with the highest word similarity calculated of all the candidates is identified as a decision and output as a recognition result from the identifier 21.

In view of the previous discussions, the conventional art still leaves ample room for improvement in Lombard speech recognition in the light of the following problematic aspects.

Firstly, a great amount of Lombard speech learn data is required in the conventional art to provide the acoustic-phonetic variability models corresponding to all kinds of sub-phoneme HMMs. The acoustic-phonetic variability model corresponding to a sub-phoneme can be generated based on Lombard speech learn data including the corresponding sub-phoneme, and in other words, the acoustic-phonetic variability model cannot be provided with Lombard speech learn data including no corresponding sub-phoneme. A small number of speech data cannot include all kinds of sub-phonemes.

Secondly, it is desirable to generate the acoustic-phonetic variability model based on a larger amount of Lombard speech learn data for recognition accuracy. The acoustic-phonetic variability model based on a smaller amount of speech data may cause distortion and degrade an overall Lombard speech recognition.

Thirdly, a preliminary separate learn operation of duration changes by Lombard effect covering all kinds of sub-phonemes involves a costly collection and processing of a great amount of Lombard speech data from a plurality of speakers.

Furthermore, the separately provided speaker-independent duration change data are not optimal to a speaker-dependent recognition of Lombard speech with word duration depending greatly on speakers and may degrade a performance in Lombard speech recognition.

In view of these problems, an object of the present invention is to provide a speech recognition apparatus having an improved spectrum modification based on a smaller amount of unnatural speech data. One or more learned acoustic-phonetic variability models are used to modify the mean vector of the normal speech model sub-phoneme HMM, and consequently all of the normal speech model sub-phoneme HMMs are modified based on the smaller amount of unnatural speech data.

Another object of the present invention is to provide a speech recognition apparatus having an improved function of learning and generating the acoustic-phonetic variability model of higher quality for recognition accuracy based on a smaller amount of unnatural speech data. One or more learned acoustic-phonetic variability models are used to generate the acoustic-phonetic variability model having less effect of distortion even based on the smaller amount of unnatural speech data.

A further object of the present invention is to provide a speech recognition apparatus having an additional learn function of duration changes by unnatural speech effect in the learn mode of operation. Duration data are extracted from unnatural speech data in a series of learning and generating of the acoustic-phonetic variability model and then the duration changes are learned based on the extracted duration data. An incorporated extraction of unnatural speech duration and the corresponding duration change data reduces the costly preliminary separate operation and a speaker-dependent duration change data improves recognition accuracy of unnatural speech.

SUMMARY OF THE INVENTION

This and other objects are accomplished by the following aspects of the present invention.

According to one aspect of the present invention, a speech recognition apparatus includes an acoustic analyzer for analyzing an input speech signal of unnatural speech and extracting a time-series feature vector from the input speech signal; a normal speech model memory for storing a normal speech model learned based on normal speech data; an acoustic-phonetic variability model memory for storing a plurality of acoustic-phonetic variability models, each representing an acoustic-phonetic change of spectrum caused by unnatural speech; and speech recognize means for generating an unnatural speech model based on the normal speech model and at least one of the plural of acoustic-phonetic variability models corresponding to another of the normal speech models, for recognizing the input speech signal of unnatural speech based on the time-series feature vector and the unnatural speech model, and for outputting a recognition result.

The speech recognize means may generates the unnatural speech model based on the normal speech model and at least two of the plurality of acoustic-phonetic variability models.

According to another aspect of the present invention, a speech recognition apparatus includes an acoustic analyzer for analyzing an input speech signal of unnatural speech and extracting a time-series feature vector from the input speech signal; a normal speech model memory for storing a normal speech model learned based on normal speech data; an acoustic-phonetic variability model memory for storing an acoustic-phonetic variability model representing an acoustic-phonetic change of spectrum caused by the unnatural speech; and speech learning means for learning the acoustic-phonetic change with the time-series feature vector based on the normal speech model and for generating the acoustic-phonetic variability model.

According to a further aspect of the present invention, a speech recognition apparatus includes an acoustic analyzer for analyzing an input speech signal of unnatural speech and extracting a time-series feature vector from the input speech signal; a normal speech model memory for storing a normal speech model learned based on normal speech data; speech learning means for learning an acoustic-phonetic change based on the time-series feature vector and the normal speech model and for generating an acoustic-phonetic variability model based upon the acoustic-phonetic change; duration change learning means for learning a duration change by unnatural speech on a phonological unit basis based on the acoustic-phonetic variability model and the normal speech model, and for generating duration change data based upon the duration change; and a duration memory for storing the duration change data.

The speech recognize means may generate the unnatural speech model based on the normal speech model and at least two of the plurality of acoustic-phonetic variability models.

According to a still further aspect of the present invention, a speech recognition method includes the steps of storing a plurality of normal speech models, a plurality of acoustic-phonetic variability models corresponding to some of the plurality of normal speech models, and a plurality of values of weight coefficient, each representing a similarity of one of the plurality of normal speech models to another of the plurality of normal speech models; selecting a selected plurality of the acoustic-phonetic variability models having highest values of the weight coefficient with one of the normal speech models, modifying a spectrum of the one of normal speech models based on each one of the selected plurality of acoustic-phonetic variability models, and generating a plurality of modified spectra of the one of the normal speech models; calculating a mean value of the plurality of modified spectra to generate a modified normal speech model based on the mean value; and comparing the mean value modified normal speech model with input unnatural speech data and outputting a comparison result.

According to a still further aspect of the present invention, a speech recognition method includes the steps of analyzing an input speech signal to extract a time-series feature vector from the input speech signal; learning normal speech data, generating a normal speech model including a duration parameter, and storing the normal speech model; learning an acoustic-phonetic variability model representing an acoustic-phonetic change of spectrum caused by unnatural speech based on the normal speech model and the time-series feature vector; calculating a duration change by unnatural speech on a phonological unit basis based on the normal speech model and the acoustic-phonetic variability model, and storing duration change data; modifying the duration parameter of the normal speech model based on the duration change data, and generating a parameter-modified normal speech model; and recognizing the time-series feature vector based on the parameter-modified normal speech model and the acoustic-phonetic variability model, and outputting a recognition result.

According to another aspect of the present invention, a speech recognition apparatus for recognizing an input utterance having an acoustic-phonetic change of spectrum caused by unnatural speech includes an acoustic analyzer for extracting a feature vector from the input utterance; a normal speech data memory for providing a learning result of normal speech data; a memory for providing a learning result of the acoustic-phonetic change; and a speech recognition unit having an input that receives the feature vector and an output that provides a recognition result, the speech recognition unit including means for modifying the learning result of normal speech data based on at least one of the learning results of acoustic-phonetic change and for generating a modified speech model based on the acoustic-phonetic change, the at least one of the learning results of acoustic-phonetic change may not correspond to the learning result of normal speech model.

The learning result of normal speech data may be a normal speech model on a phonological unit basis; and the learning result of the acoustic-phonetic change may be an acoustic-phonetic variability model on the phonological unit basis.

According to a still further aspect of the present invention, a speech recognition apparatus includes an acoustic analyzer for extracting a feature vector from an input utterance; a normal speech data memory for providing a learning result of normal speech data; and a speech learning unit including means for learning an acoustic-phonetic change of spectrum caused by unnatural speech to generate a learning result; and means for modifying the learning result of normal speech data based on at least one of the learning result of the acoustic-phonetic change to generate a reference speech model.

The learning result of normal speech data may be a normal speech model on a phonological unit basis and the learning result of the acoustic-phonetic change may be an acoustic-phonetic variability model on the phonological unit basis.

According to a still further aspect of the present invention, a method for modifying a sub-phoneme speech model to provide a modified sub-phoneme model to be used for speech recognition includes the steps of (A) receiving a first sub-phoneme model; (B) determining whether a corresponding modification parameter exists for the first sub-phoneme model; (C) when the corresponding modification parameter exists, modifying the first sub-phoneme model based upon the corresponding modification parameter, to create the modified sub-phoneme model; and (D) when the corresponding modification parameter does not exist, modifying the first sub-phoneme model based upon a modification parameter that corresponds to a second sub-phoneme model, to create the modified sub-phoneme model.

According to a still further aspect of the present invention, an apparatus for modifying a sub-phoneme speech model to provide a modified sub-phoneme model to be used for speech recognition includes first means for receiving a first sub-phoneme model; second means for determining whether a corresponding modification parameter exists for the first sub-phoneme model; third means for modifying the first sub-phoneme model based upon the corresponding modification parameter when the corresponding modification parameter exists, to create the modified sub-phoneme model; and fourth means for modifying the first sub-phoneme model based upon a modification parameter that corresponds to a second sub-phoneme model when the corresponding modification parameter does not exist, to create the modified sub-phoneme model.

BRIEF DESCRIPTION OF THE DRAWINGS

The present invention will be better understood with reference to the accompanying drawings, in which:

FIG. 4 shows a chart illustrating the normal speech models 7 and the mean vectors Xi processed in the speech recognition apparatus of this embodiment;

FIG. 5 shows a chart illustrates the acoustic-phonetic variability models 8 and the corresponding parameters processed in the speech recognition apparatus of this embodiment;

FIG. 7 is a table of weight coefficients between the i-th and j-th sub-phoneme HMMs;

FIG. 15 shows a chart illustrating the normal speech models including the mean vectors, X1 through X300, and the duration parameters representing the average values, N1 through N300, and distribution values, δ1 through δ300, of the 300 kinds of the normal speech model sub-phoneme HMMs;

FIG. 16 shows a chart illustrating sub-phoneme duration change data listing the average values, ΔN1 through ΔN300, and distribution values, Δδ1 through Δδ300, of the 300 kinds of sub-phoneme HMMs;

DESCRIPTION OF THE PREFERRED EMBODIMENTS

Embodiment 1

Figure 1:
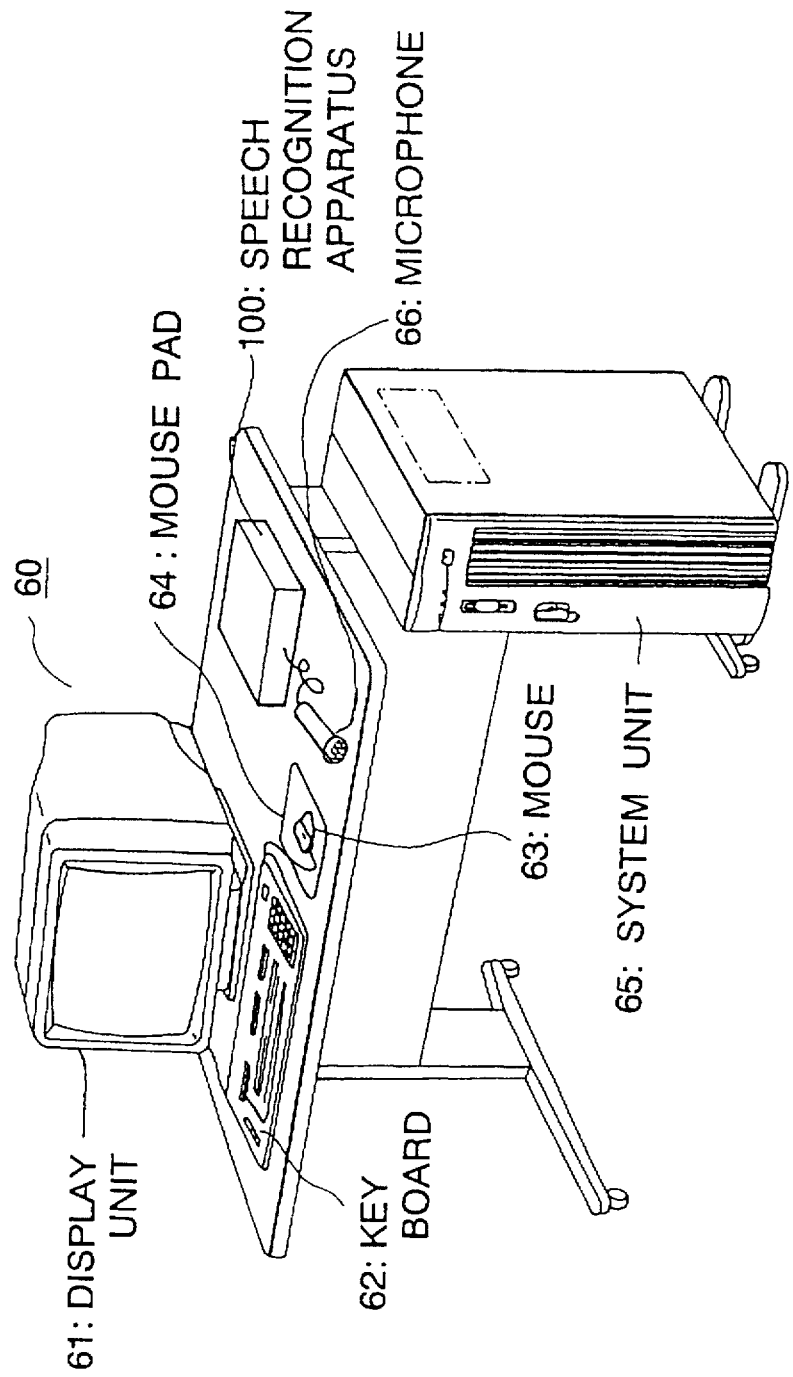
FIG. 1 shows a speech processing system 60 including a speech recognition apparatus according to a first embodiment of the present invention.

FIG. 1 shows a speech processing system 60 which processes Lombard speech including any forms of speech uttered in an unnatural environment and speech by the disabled. The speech processing system 60 includes a display unit 61, a keyboard 62, a mouse 63, a mouse pad 64, a system unit 65, a microphone 66 and a speech recognition apparatus 100 according to the present invention. According to the speech processing system 60, input words of utterance captured at the microphone 66 are recognized by the speech recognition apparatus 100, whose result is displayed in characters on the screen of the display unit 61 via the system unit 65. The speech recognition apparatus 100 is applicable to possibly any type of speech processing system including that illustrated in FIG. 1, for example, to a personal computer operated system or to a work-station type system. The microphone based speech data entry system of FIG. 1 is replaceable with a tape-recorder based speech data entry system or a speech data entry device included in a networking system. The speech recognition apparatus 100 is applicable to digital or analog data processing of speech signals. The speech recognition apparatus 100 may be a separate unit in the system 60 as illustrated in the figure or a part of the system unit 65 incorporated within the unit 65. The speech recognition apparatus 100 may, otherwise, possibly be mounted on a board or chip board to be a system board part of a computer system or a machine tool. The recognition result of the speech recognition apparatus 100 may be used for, other than the character display on the screen, the instruction or command for searching data in a computer or for processing materials in a machine tool or measuring device, for example.

Figure 2:
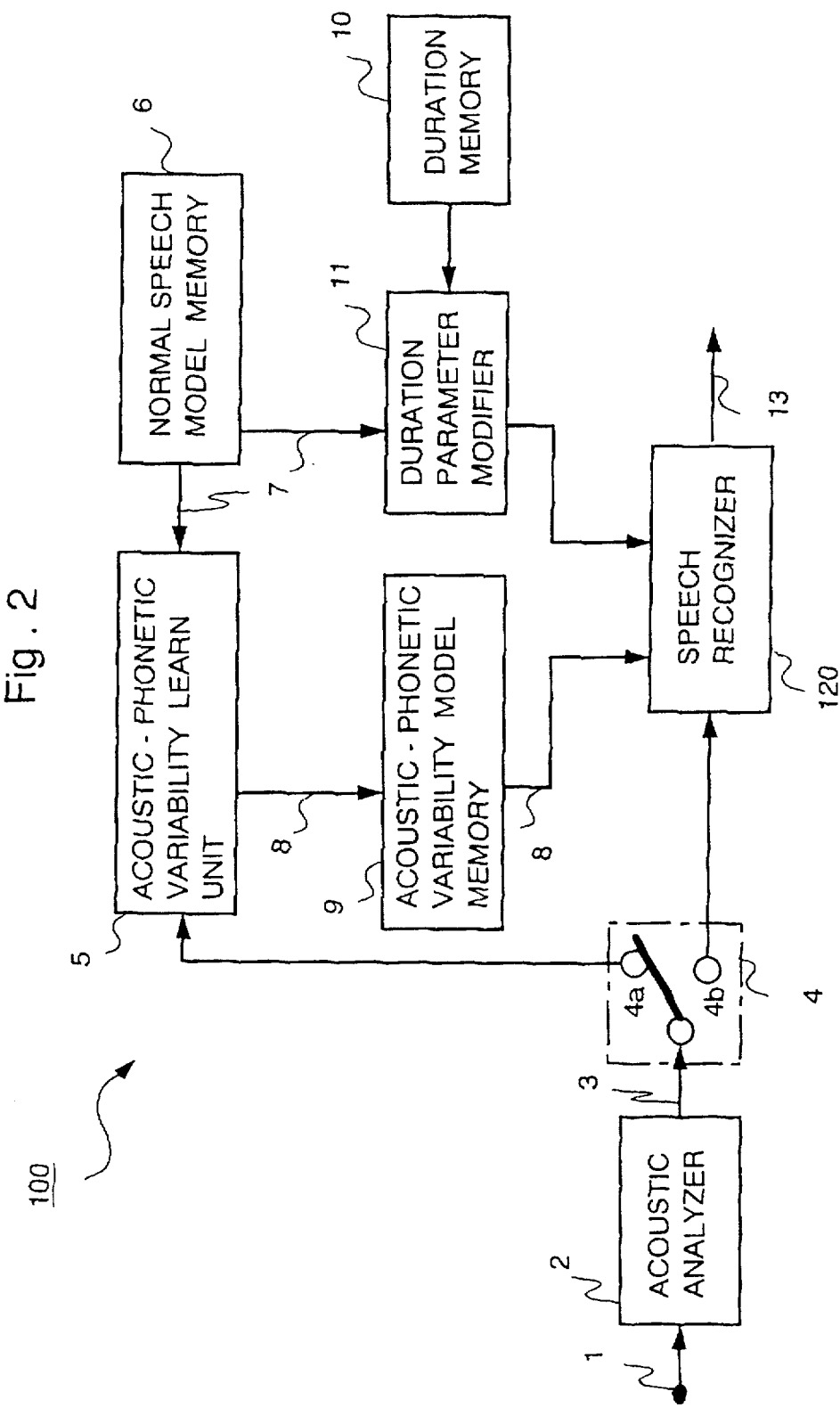
FIG. 2 is a detailed block diagram of the speech recognition apparatus of FIG. 1 according to one embodiment.
Figure 17:
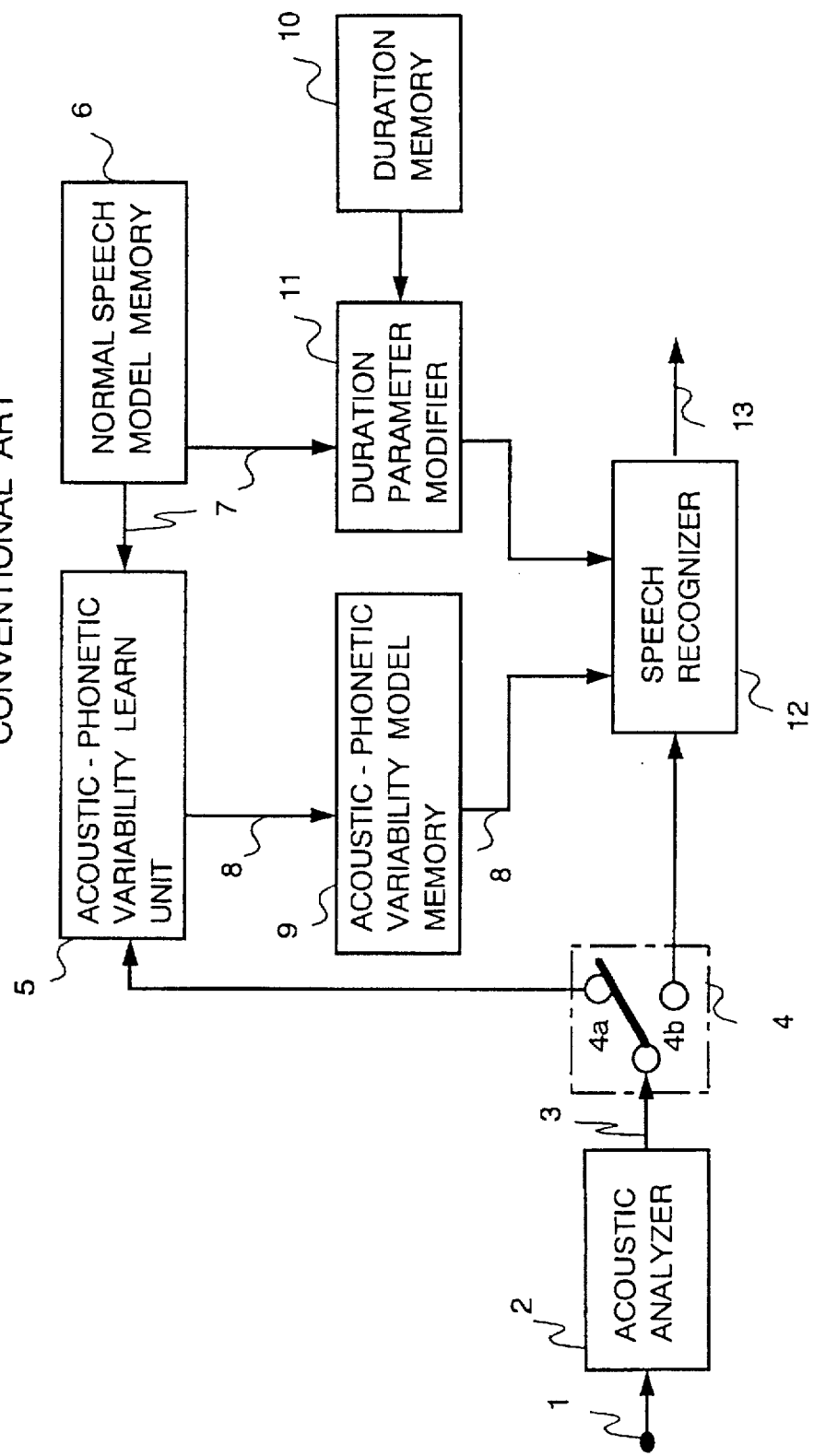
FIG. 17 is a block diagram of a speech recognition apparatus according to a conventional art.

FIG. 2 is a detailed block diagram of the speech recognition apparatus 100 of FIG. 1 according to an embodiment of the present invention. The embodiment of the speech recognition apparatus 100 modifies the embodiment of the speech recognition apparatus of FIG. 17 with the replacement of an inventive speech recognizer 120 in the place of the speech recognizer 12. The duration memory 10 and the duration parameter modifier 11 may be considered optional and thus not mentioned in detail here.

A discrete word recognition based on continuous density sub-phoneme HMM is now discussed according to this embodiment with reference to FIGS. 2 through 7. The normal speech model memory 6 stores the normal speech models representing sub-phoneme HMMs learned in a preliminary learn operation based on normal speech data and word models, each in a string of sub-phoneme HMMs, representing vocabulary words for recognition. Operational descriptions of this embodiment equivalent to those of the conventional discrete word recognition based on continuous density sub-phoneme HMM discussed earlier will not be reiterated here.

Figure 3:
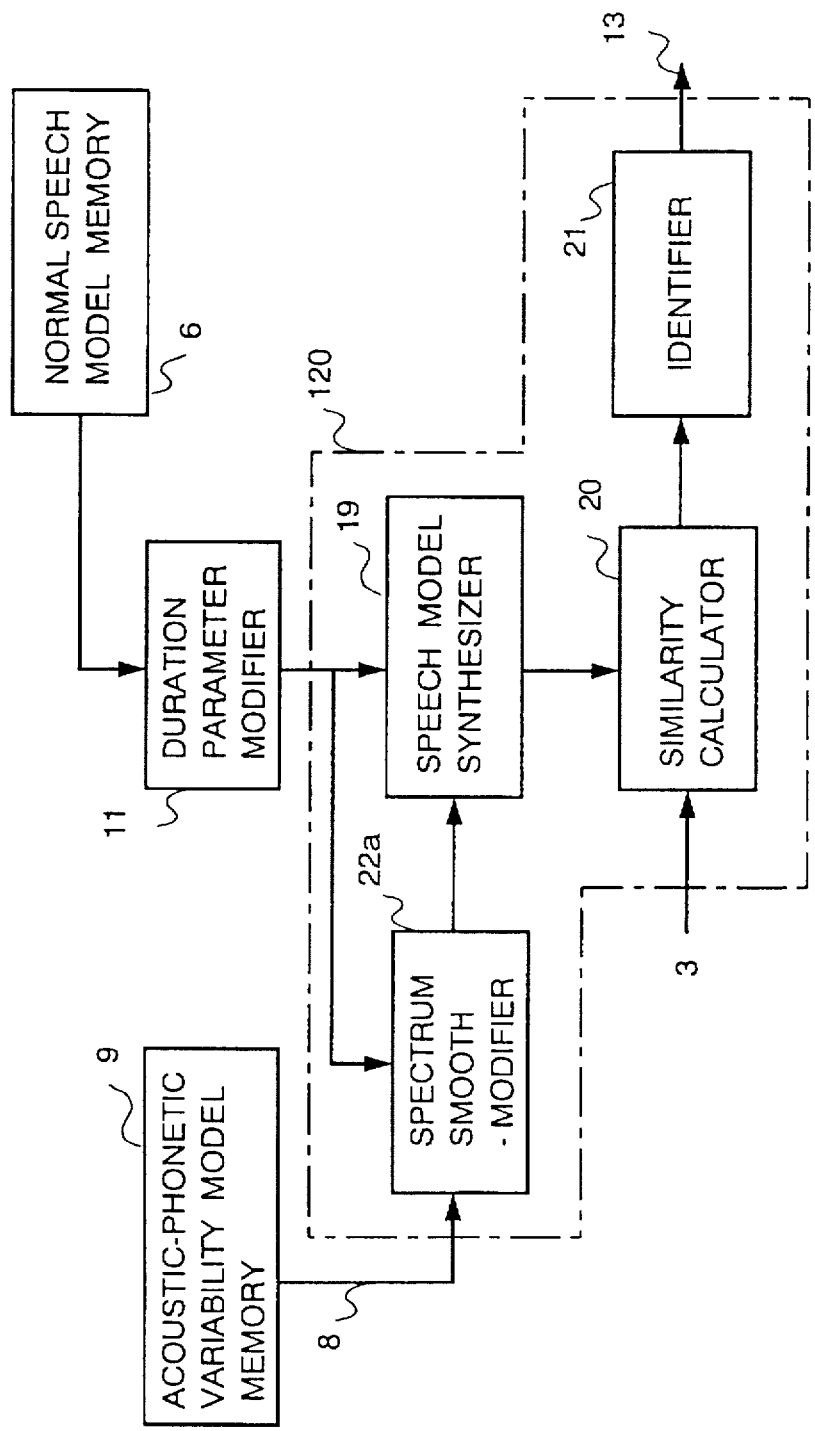
FIG. 3 is a detailed block diagram of the speech recognizer of the speech recognition apparatus of FIG. 2.
Figure 25:
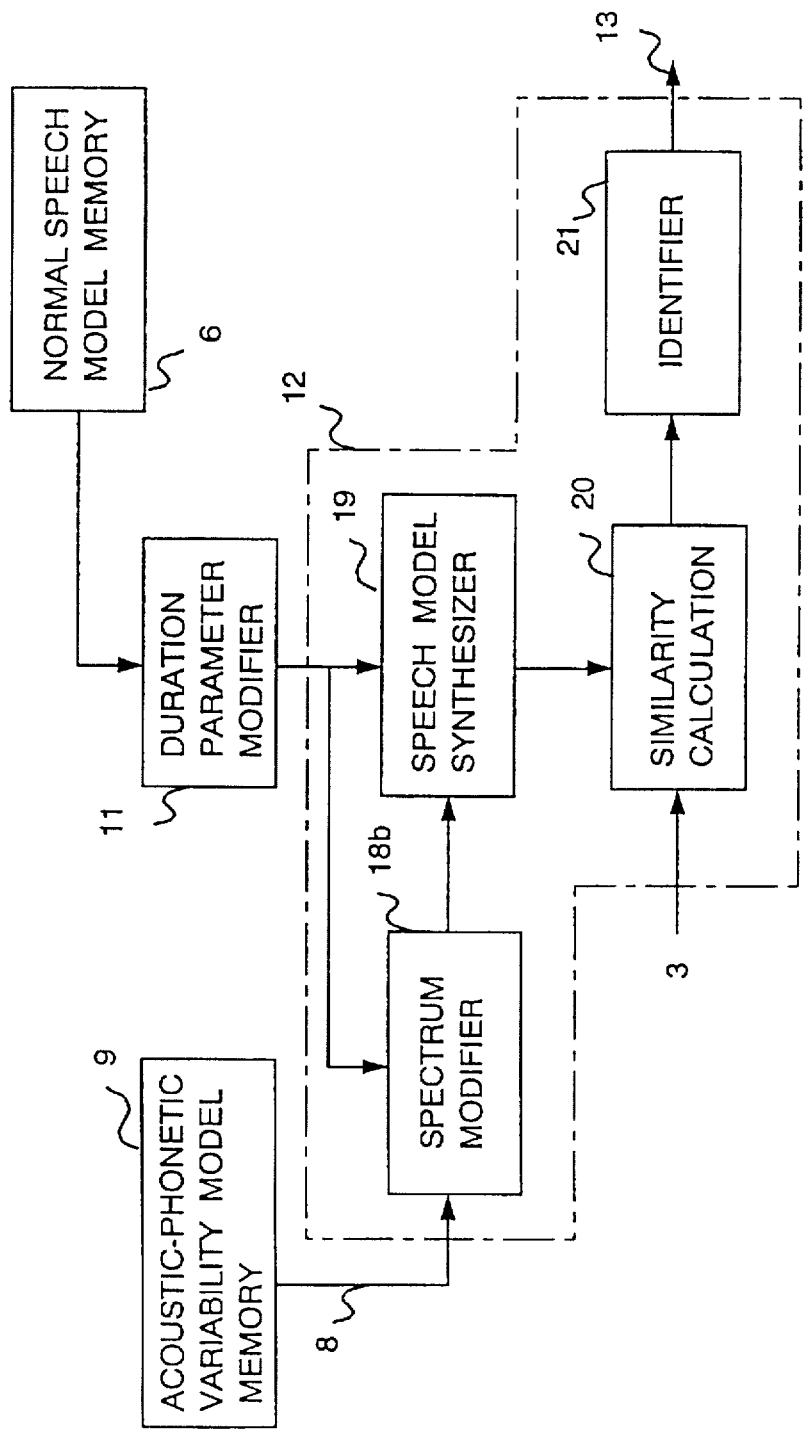
FIG. 25 is a detailed block diagram of a conventional speech recognizer of FIG. 17.

FIG. 3 is a detailed block diagram of the inventive speech recognizer 120 of FIG. 2. The embodiment of the inventive speech recognizer 120 modifies the embodiment of the speech recognizer 12 of FIG. 25 with the replacement of an inventive spectrum smooth-modifier 22a for the spectrum modifier 18b. The functional descriptions of the elements 18 though 20 of FIG. 3 that are equivalent to those of FIG. 25 will not be reiterated in detail here.

The inventive spectrum smooth-modifier 22a inputs the normal speech model sub-phoneme HMMs stored in the normal speech model memory 6 via the duration parameter modifier 11 and the acoustic-phonetic variability models 8 from the acoustic-phonetic variability model memory 9. Each sub-phoneme HMM of the normal speech model 7 is modified on the spectrum envelope of the mean vector based on some, one or more, of the acoustic-phonetic variability models 8 learned and stored in the memory 9. The inventive spectrum smooth-modification is thus performed through all of the sub-phoneme HMMs of the normal speech models 7 stored in the memory 6.

The inventive spectrum smooth-modification in the spectrum smooth-modifier 22a is based on the following formula (1):

$$Y_i = \frac{\sum_{j}^{n} W(i,j) \cdot M_j(X_i)}{\sum_{j}^{n} W(i,j)} \quad (1)$$

Referring to formula (1), a mean vector Xi is of the i-th sub-phoneme HMM of the normal speech model 7 and a mean vector Yi is of the i-th sub-phoneme HMM modified in the spectrum smooth-modifier 22a. A spectrum modification Mj (Xi) designates a modification on the mean vector Xi based on the acoustic-phonetic variability model 8 corresponding to the j-th sub-phoneme HMM learned and stored in the memory 9. Summation involves n number of the learned j-th sub-phoneme HMMs having the highest value of weight coefficient W(i,j) between the i-th and j-th sub-phoneme HMMs. The number n is determined depending on a certain ratio to the total number of learned j-th sub-phoneme HMMs having the corresponding acoustic-phonetic variability models 8. The number of the acoustic-phonetic variability models used for the modification of the i-th sub-phoneme HMM Mj(Xi) is then be controlled by the ratio.

The weight coefficient W(i,j) is defined in inverse proportion of an optimal distance d(Xi,Xj) defined between the mean vectors Xi and Xj, respectively, of the i-th and j-th sub-phoneme HMMs. Higher value of weight coefficient between two sub-phoneme HMMs designates higher similarity between the spectrum envelopes of the mean vectors. The following shows a formula (2) calculating the weight coefficient W(i,j):

$$W(i,j) = (d(X_i, X_j) + q)^{-p} \quad (2)$$

Referring to formula (2), parameter p and q, both of positive values, controls the weight coefficient W(i,j) for the distance d(Xi, Xj). The distance may be represented by a cepstrum based Euclidean Distance or a WLR (Weight Likelihood Ratio Measure) measurement of distance.

FIGS. 4 through 7 illustrate the spectrum modification of this embodiment discussed above in more detail assuming that 300 kinds of the normal speech model sub-phoneme HMMs are provided in the normal speech model memory.

Figure 6:
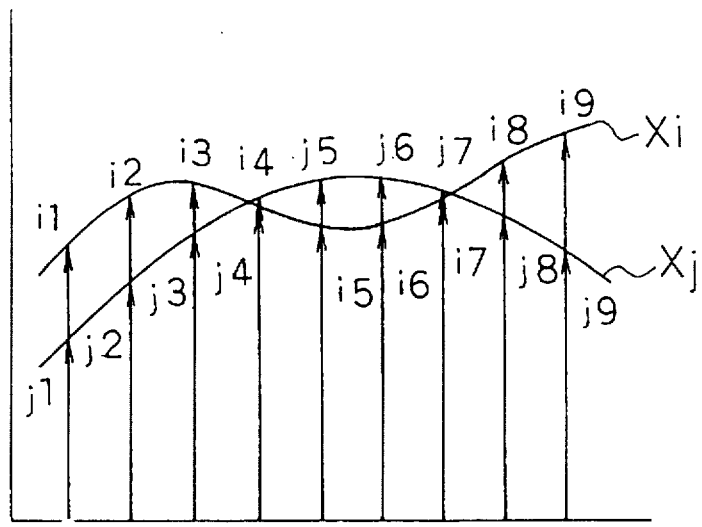
FIG. 6 shows spectrum envelopes of the mean vectors Xi and Xj of, respectively, the i-th and j-th sub-phoneme HMMs of FIG. 4 illustrating a spectrum distance between the mean vectors Xi and Xj.

FIG. 4 shows a chart of the normal speech models V provided with the mean vectors Xi. The chart illustrates mean vectors X1 through X300 corresponding to the 300 kinds of the normal speech model sub-phoneme HMMs. FIG. 5 shows a chart of the acoustic-phonetic variability models 8 represented by the parameter sets H, T and Q. A list of the acoustic-phonetic variability models of FIG. 5 corresponds to the list of the normal speech models in the chart of FIG. 4. If there is no parameter set listed in the chart of FIG. 5, this indicates that the corresponding sub-phoneme HMM of the normal speech model of FIG. 4 is unlearned. For example, the third and 299th sub-phoneme HMMs are unlearned, and therefore do not have the parameter sets representing the acoustic-phonetic variability models. FIG. 6 shows spectrum envelopes of the mean vectors Xi and Xj of, respectively, the i-th and j-th sub-phoneme HMMs of FIG. 4 illustrating a spectrum distance between the mean vectors Xi and Xj. The spectrum distance is calculated based on an equation (E1) using square differences between the mean vectors Xi and Xj:

$$d(Xi, Xj) = |i1-j1|^2 + |i2-j2|^2 + \ldots + |i9-j9|^2 \qquad \text{(E1)}$$

FIG. 7 is a table of weight coefficient between the i-th and j-th sub-phoneme HMMs. The weight coefficient is calculated based on the spectrum distance d(Xi.Xj) between the mean vectors Xi and Xj. Values of weight efficient between the i-th and j-th sub-phonemes on the table are calculated based on formula (2) involving equation (E1) of spectrum distance. When one is given to both p and q (p=1, q=1) in formula (2), the spectrum distance between two of the i-th sub-phonemes d(Xi.Xi) is zero, and the value of weight coefficient of the i-th sub-phoneme then becomes one:

$$W(Xi, Xi) = (0+1)^{-1} = 1^{-1} = 1$$

A modified mean vector Y3, for example, of the mean vector X3 of the unlearned third sub-phoneme HMM of FIG. 4 can be calculated in the following equation (E2) involving formulas (1) and (2) and equation (E1) with the summation involving two items (n=2) of the j-th sub-phoneme in Mj(Xi).

$$Y3 = \frac{0.9 \cdot M1(X3) + 0.8 \cdot M2(X3)}{0.9 + 0.8} \qquad \text{(E2)}$$

Referring to equation (E2), with the third sub-phoneme as the i-th sub-phoneme, Mj(X3), the first and second sub-phoneme HMMs have the highest values, 0.9 and 0.8 respectively, of weight coefficient w(i.j) according to the table of weight coefficient of FIG. 7. The highest value, 1.0, of the weight coefficient is owned by the i-th sub-phoneme itself. However, the third sub-phoneme HMM is unlearned in this example, and has no parameters for modification representing the corresponding acoustic-phonetic variability model 8 and therefore, in this case, the highest value 1.0 of weight coefficient is ignored. Now, a spectrum modification on the mean vector X3 of the third sub-phoneme HMM of FIG. 4, M1(X3), is calculated based on parameter set H1, T1 and Q1 of FIG. 5 representing the acoustic-phonetic variability model 8 corresponding to the first sub-phoneme HMM. A spectrum modification M2(X3) is calculated based on parameter set H2, T2 and Q2 corresponding to the second sub-phoneme HMM. Mean vector Y3 of modified mean vector X3 of the third sub-phoneme is then calculated in the above equation. Thus, an unlearned sub-phoneme HMM can be modified using one or more of the acoustic-phonetic variability models based on weight coefficient in the spectrum smooth-modifier 22a for compensating spectral changes by unnatural speech effect.

Further with reference to formula (1), a learned sub-phoneme having the corresponding acoustic-phonetic variability model 8 is desirable to be modified in the spectrum smooth-modifier 22a based on formula (1). For example, a mean vector Y1 of modified mean vector X1 of the learned first sub-phoneme of FIG. 5 is modified using two parameter sets of the acoustic-phonetic variability models corresponding to sub-phoneme HMMs having the highest value of weight coefficient based on the following equation E3 under the same condition (n=2) as above.

$$Y1 = \frac{1.0 \cdot M1(X1) + 0.9 \cdot M2(X1)}{1.0 + 0.9} \qquad \text{(E3)}$$

Referring to equation (E3), a spectrum modification is performed on the mean vector X1 using the parameter set H1, T1 and Q1 of the acoustic-phonetic variability model corresponding to the first sub-phoneme itself and the parameter set H2, T2 and Q2 of the acoustic-phonetic variability model corresponding to the second sub-phoneme. According to the table of weight coefficient of FIG. 7, the first sub-phoneme HMM itself has the highest value, 1.0, of weight coefficient and the second sub-phoneme HMM has the second highest value, 0.9. Thus, the inventive spectrum smooth-modifier 22a modifies a mean vector of a learned sub-phoneme to make the spectrum even smoother in higher quality for avoiding distortion using the parameters of the acoustic-phonetic variability model 8 corresponding to a sub-phoneme HMM having a similar spectrum to that of the modified sub-phoneme HMM based on weight coefficient.

The calculations used in this embodiment are based on the following study document "incorporated for reference": A Study for Lombard Speech Recognition by Tadashi SUZUKI (MITSUBISHI Elect. Corp.), 3-8-12 (pp.147–148), abstract of paper read at Japan Acoustic Society Study Meeting, October, 1993.

Figure 8:
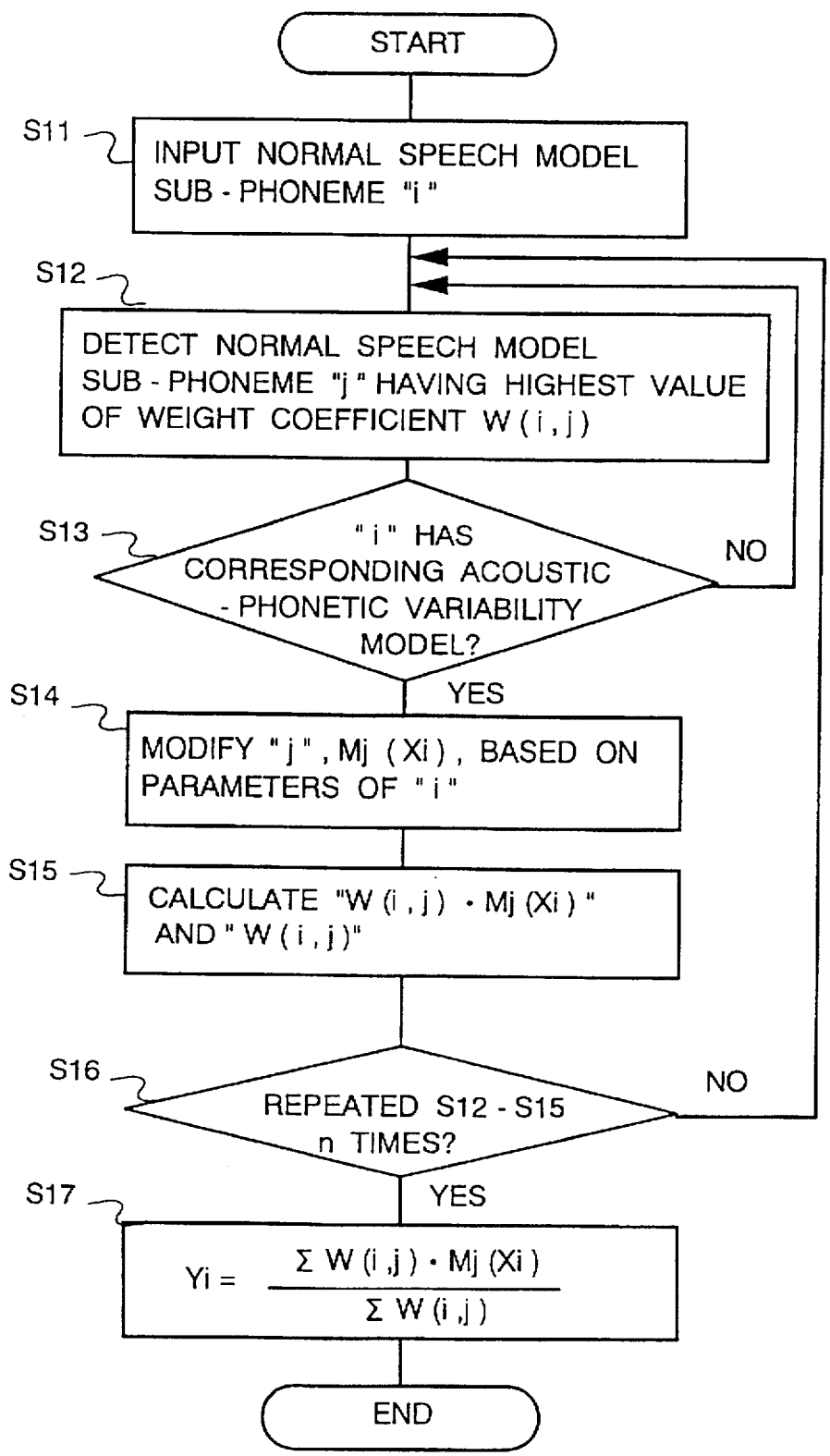
FIG. 8 is a flowchart illustrating the inventive spectrum smooth-modification performed in the spectrum smooth-modifier in the speech recognizer of FIG. 3.

FIG. 8 is a flowchart illustrating the inventive spectrum smooth-modification performed in the spectrum smooth-modifier 22a. In a series of operating steps S11 through S17, the spectrum of the i-th sub-phoneme HMM of the normal speech model 7 is modified using the parametric representations of the acoustic-phonetic variability model 8 corresponding to the j-th sub-phoneme HMM based on formula (1) as follows.

Step S11

The i-th normal speech model sub-phoneme HMM is input in the spectrum smooth-modifier 22a from the normal speech model memory 6.

Step S12

A sub-phoneme HMM having the most similar spectrum, the j-th sub-phoneme HMM with the highest value of weight coefficient W(i,j), to that of the i-th sub-phoneme HMM is detected. Each time step S12 is performed, one sub-phoneme is detected that has the highest value of weight coefficient W(i,j) among the rest.

Step S13

The detected sub-phoneme is examined to determine whether it is learned, and thus has a corresponding parameter set representing the acoustic-phonetic variability model 8 stored in the acoustic-phonetic variability model memory 9.

If the j-th sub-phoneme is learned, and thus has a corresponding acoustic phonetic variability model 8 stored in the memory 9, the operation proceeds to Step S14.

If the j-th sub-phoneme is unlearned, and thus has no corresponding acoustic-phonetic variability model 8 stored in the memory 9, the operation returns to S12 to repeat the procedure of detecting a sub-phoneme HMM having the second highest value of weight coefficient W(i,j).

Step S14

The spectrum of the i-th sub-phoneme is modified by means of the parameter set, Hi, Tj and Qj, representing the acoustic-phonetic variability model 8 corresponding to the learned j-th sub-phoneme HMM.

Step S15

Numerator and denominator in formula (1) are calculated based on the given data separately.

Step S16

A series of operations in steps S12 through S15 is repeated n times depending on the number of the j-th sub-phoneme HMMs for the calculation in formula (1). When the series of operations has been repeated n times, the operation proceeds to step S17.

Step S17

Calculated results in step S15 are summed together to calculate the modified mean vector Yi of the mean vector Xi of the unlearned i-th normal speech model sub-phoneme HMM based on formula (1).

As the flowchart depicts, the i-th sub-phoneme obtained in S11, whether it is learned or unlearned, can be processed through the operating steps S12 through S17 in the spectrum smooth-modifier 22a. If the i-th sub-phoneme is learned and n is two or more (n≥2) in S16, one or more of the parameter sets representing the acoustic-phonetic variability models 8 corresponding to other learned normal speech model sub-phoneme HMMs are reflected on the spectrum modification. If the i-th sub-phoneme is learned and n is one (n=1), a parameter set representing the acoustic-phonetic variability model 8 corresponding to the i-th sub-phoneme HMM itself is used for the modification. If the i-th sub-phoneme is unlearned and n is one (n=1), a parameter set representing the acoustic-phonetic variability model 8 corresponding to a learned normal speech model sub-phoneme HMM is used for the spectrum modification.

Specifically, with the learned i-th sub-phoneme, the i-th sub-phoneme itself is first detected as the most similar of the j-th sub-phoneme having the highest value of weight coefficient W(i,j) in S12. The i-th sub-phoneme is detected as being a learned sub-phoneme in S13. The spectrum modification is performed on the spectrum of the i-th sub-phoneme based on the parameter set representing the acoustic-phonetic variability model corresponding to the i-th sub-phoneme in S14. In the second or further series of repeating operations S12 through S15 via S16, the spectrum of the i-th sub-phoneme is modified in S14 based on the parameter set corresponding to a learned j-th sub-phoneme, other than the i-th sub-phoneme, having the second or the next highest value of weight coefficient W(i,j).

The inventive spectrum smooth-modification of this embodiment is thus featured based on one or more of the acoustic-phonetic variability model 8 corresponding to a learned normal speech model sub-phoneme HMM whose spectrum is similar to that of the speech model sub-phoneme HMM to be modified. This enables a spectrum modification on an unlearned normal speech model sub-phoneme HMM having no corresponding acoustic-phonetic variability model 8 in the memory. This also realizes a quality spectrum modification avoiding distortion on a learned sub-phoneme based on the acoustic-phonetic variability model corresponding to the normal speech model sub-phoneme HMM having a similar spectrum as that of the speech model sub-phoneme HMM to be modified.

Embodiment 2

Figure 9:
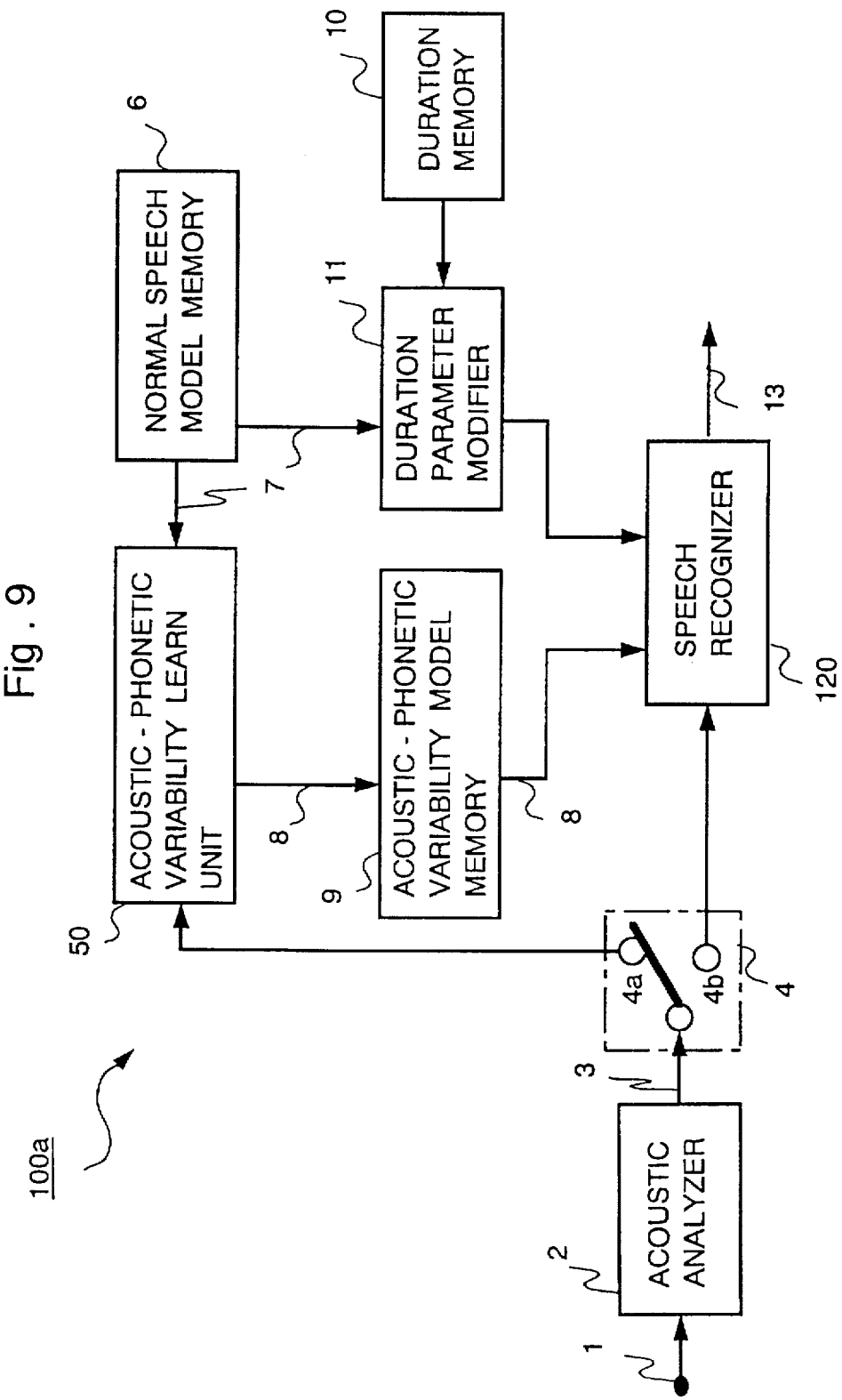
FIG. 9 shows a block diagram of a speech recognition apparatus according to a second embodiment of the present invention.
Figure 10:
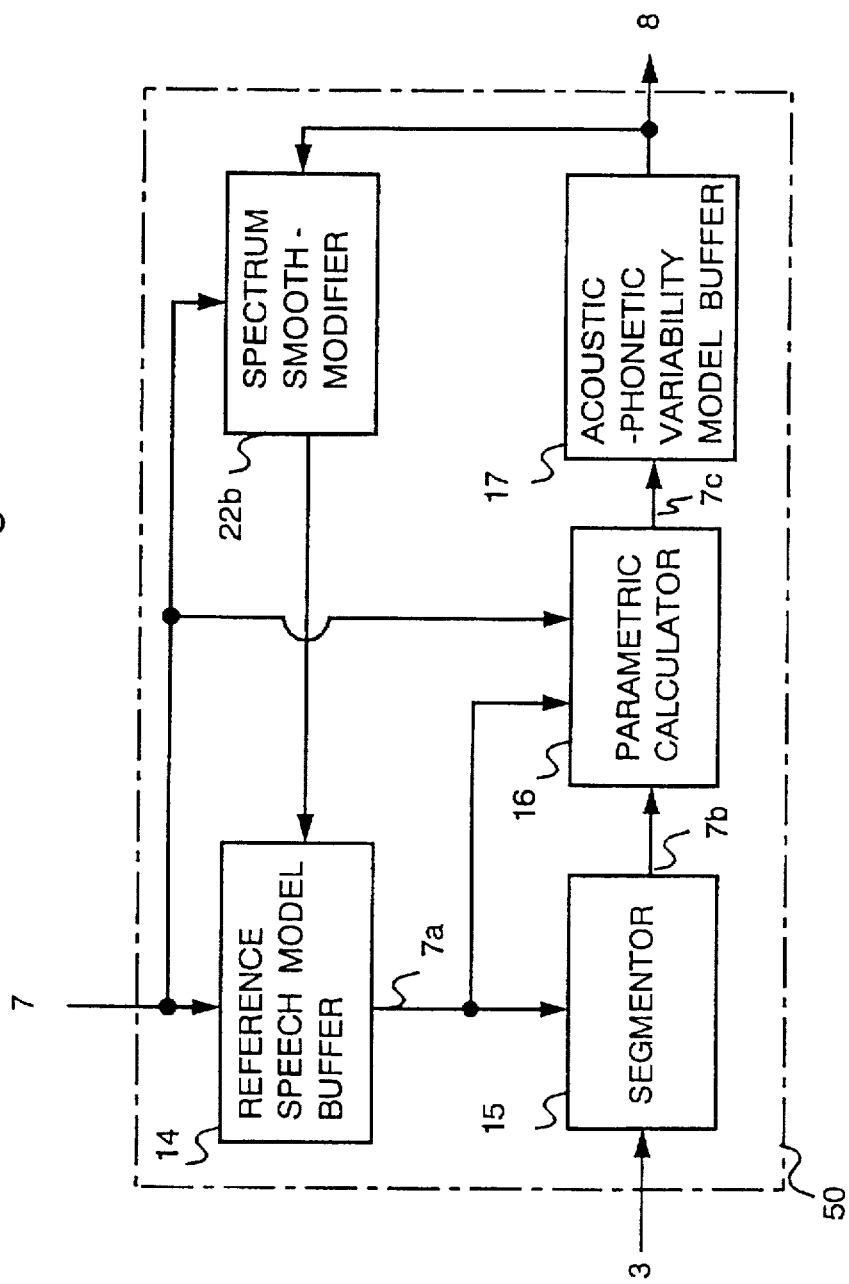
FIG. 10 shows a detailed block diagram of the inventive acoustic-phonetic variability learn unit in the speech recognition apparatus of FIG. 9.
Figure 18:
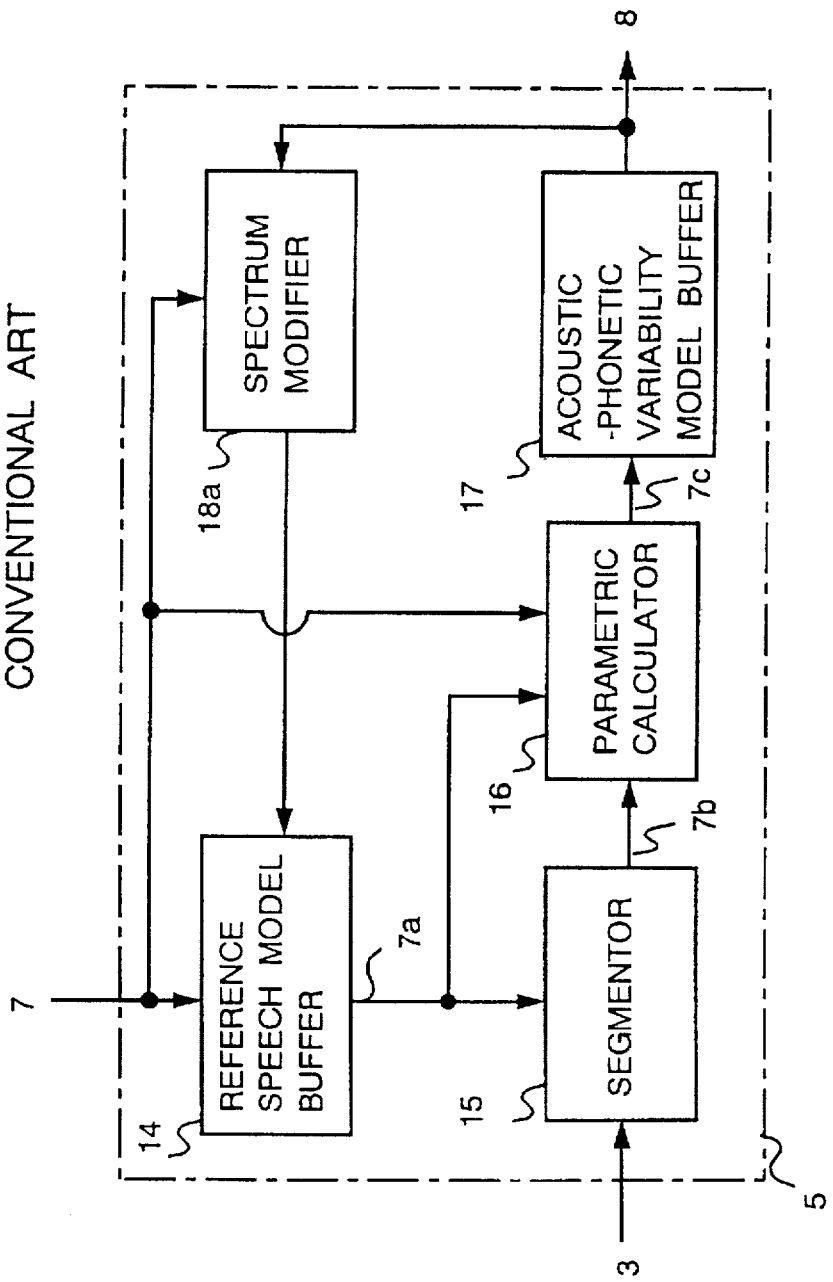
FIG. 18 is a detailed block diagram of a conventional acoustic-phonetic variability learn unit in the conventional speech recognition apparatus of FIG. 17.
Figure 19:
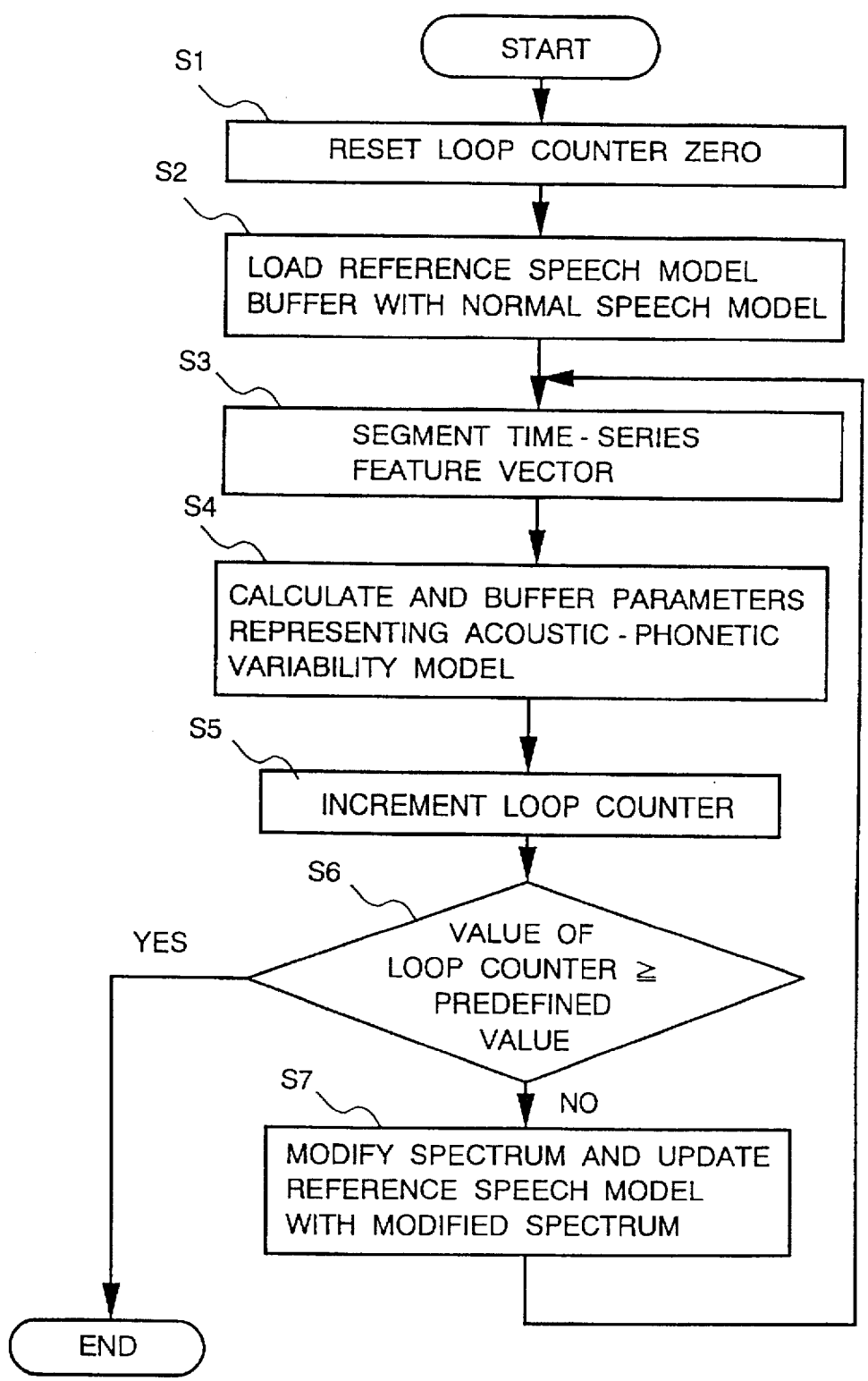
FIG. 19 is a flowchart illustrating a series of operating steps of learning and generating the acoustic-phonetic variability model in a conventional acoustic-phonetic variability learn unit of FIG. 18.
Figure 20:
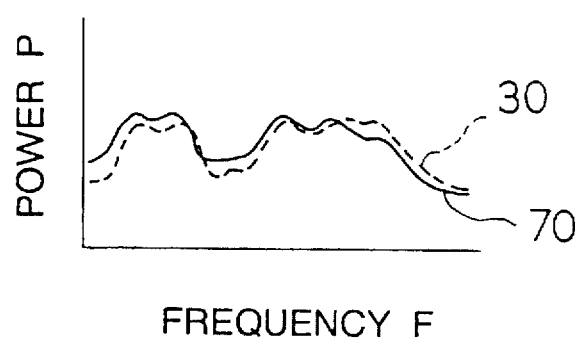
FIG. 20 shows a difference between spectral envelopes of the time-series feature vector and the normal speech model.
Figure 21:
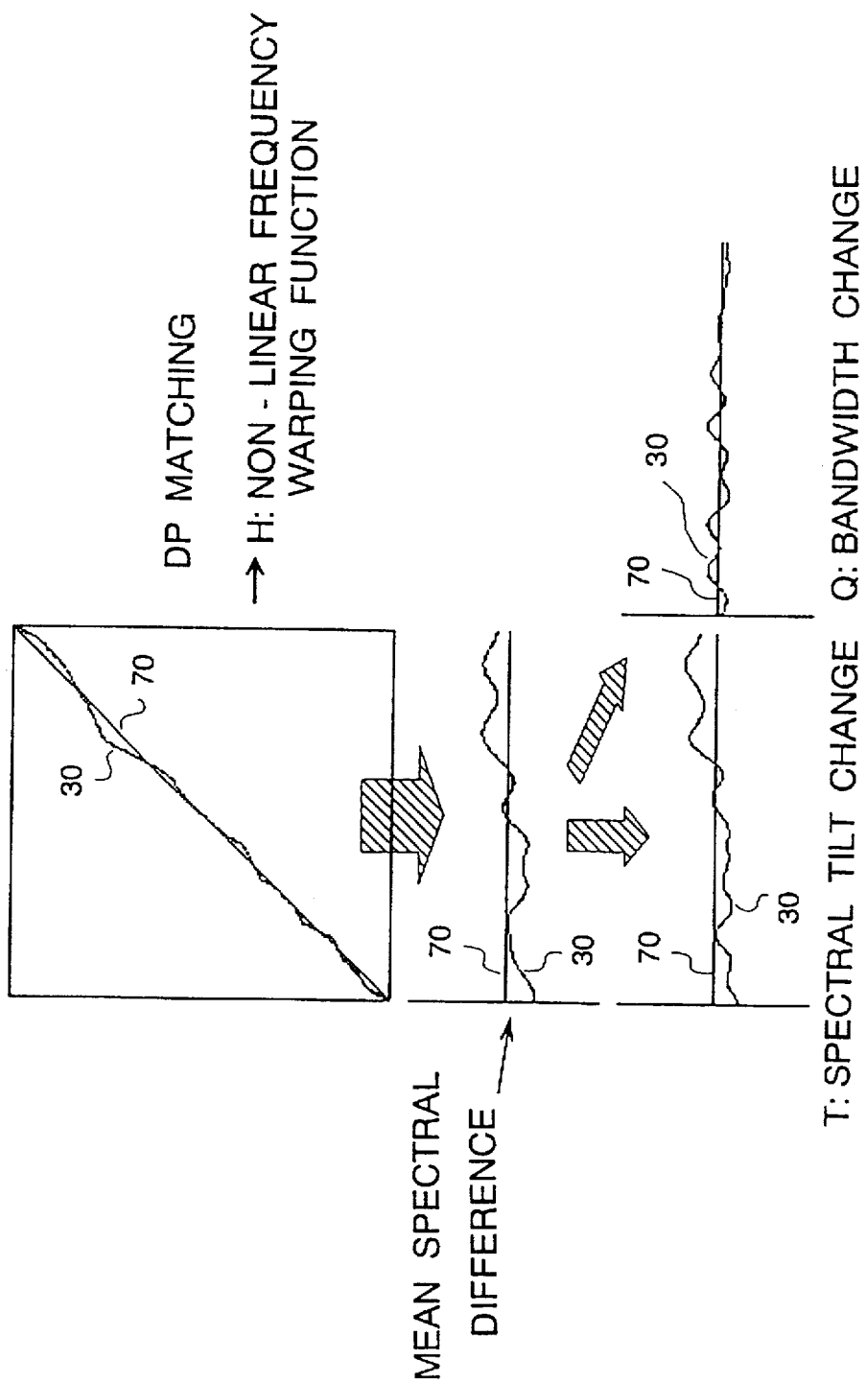
FIG. 21 illustrates a parametric calculation of the three factors in the parametric calculator in the acoustic-phonetic variability learn unit of FIG. 17.
Figure 22:
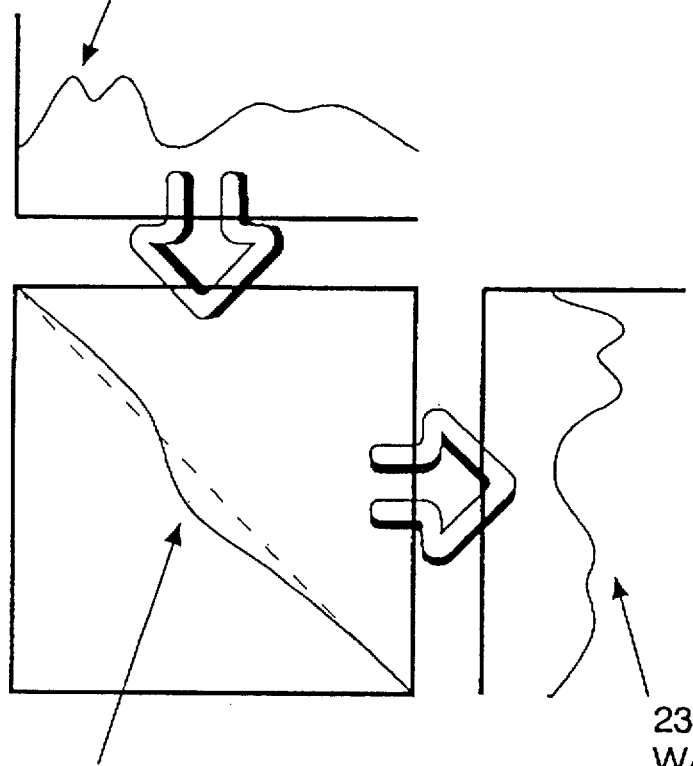
FIG. 22 illustrates the spectral envelope being modified based on Parameter H of the non-linear frequency warping function for compensating the formant shift.
Figure 23:
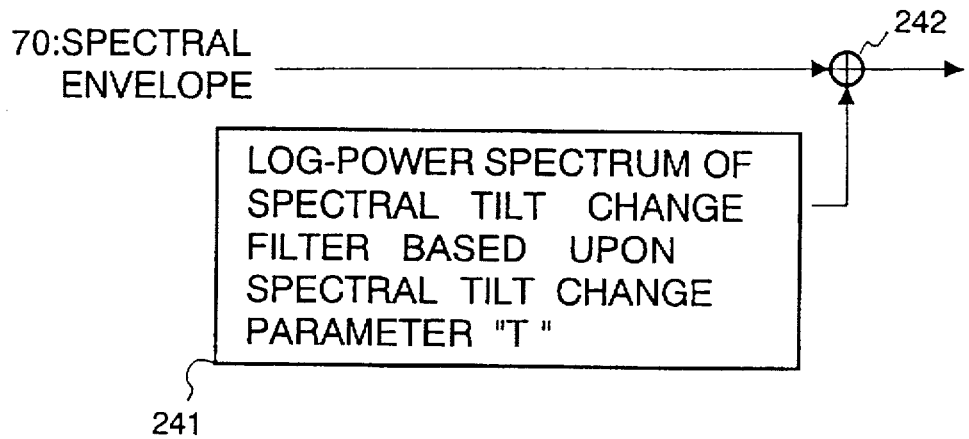
FIG. 23 illustrates the spectral envelope being modified based on Parameter T for compensating the spectral tilt change.
Figure 24:
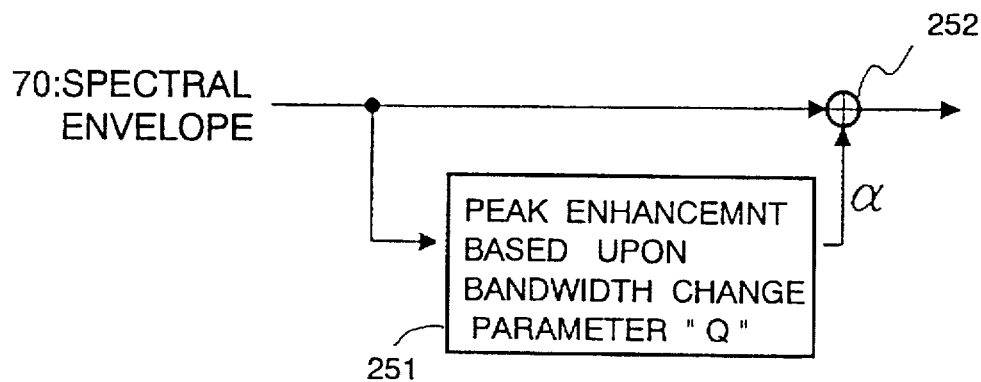
FIG. 24 illustrates the spectral envelope being modified based on Parameter Q for compensating the bandwidth change.

FIG. 9 shows a block diagram of a speech recognition apparatus 100a according to another embodiment of the present invention. The second embodiment of the speech recognition apparatus 100a modifies the embodiment of the speech recognition apparatus 100 of FIG. 2 with the replacement of an inventive acoustic-phonetic variability learn unit 50 for the acoustic-phonetic variability learn unit 5 of the first embodiment. FIG. 10 shows a detailed block diagram of the inventive acoustic-phonetic variability learn unit 50 of FIG. 9. The inventive acoustic-phonetic variability learn unit 50 of FIG. 10 modifies the acoustic-phonetic variability learn unit 5 of the previous embodiment or the conventional unit of FIG. 18 in place of the replacement of a spectrum smooth-modifier 22b in place of the spectrum modifier 18a of FIG. 18. The spectrum smooth-modifier 22b performs spectrum modification on all of the normal speech models 7 stored in the normal speech model memory 6 based on the acoustic-phonetic variability models 8 buffered in the acoustic-phonetic variability model buffer 17. A modified spectrum of the normal speech model 7 in the spectrum smooth-modifier 22b updates the reference speech model 7a in the reference speech model buffer 14. The functional description of other elements in FIGS. 9 and 10 equivalent to those sharing the same reference numeral of FIGS. 2 and 18 will not be reiterated in detail here.

A discrete word recognition based on continuous density sub-phoneme HMM is now discussed according to this embodiment with reference to FIGS. 9 and 10. The normal speech model memory 6 stores the normal speech models representing sub-phoneme HMMs learned in a preliminary learn operation based on normal speech data and word models in a string of sub-phoneme HMMs representing vocabulary words for recognition. Some operational descriptions of this embodiment that are equivalent to those of the conventional discrete word recognition based on continuous density sub-phoneme HMM discussed earlier will not be reiterated here.

The spectrum modification in the spectrum smooth-modification 22b is performed on all of the normal speech model sub-phoneme HMMs stored in the normal speech model memory 6 based on one or more of the acoustic-phonetic variability models stored in the acoustic-phonetic variability model buffer 17. Specifically, the spectrum smooth-modifier 22b modifies the mean vector of a sub-phoneme HMM of the normal speech model 7 for compensating for the spectral changes caused by unnatural speech effect.

A spectrum modification performed in the spectrum smooth-modifier 22b is equivalent to that in the spectrum smooth-modifier 22a of FIG. 3 in the speech recognize unit 120 of FIG. 2. The spectrum modification is performed on the spectrum of an unlearned sub-phoneme HMM of the normal speech model 7, having no corresponding acoustic-phonetic variability model 8, based on the parameter set representing the acoustic-phonetic variability model 8 corresponding to a sub-phoneme whose spectrum is similar to that of the speech model sub-phoneme HMM to be modified or whose value of weight coefficient is the highest. The spectrum modification is performed on the spectrum of a learned sub-phoneme of the normal speech model 7 having the corresponding acoustic-phonetic variability model 8 based on the parameters representing the acoustic-phonetic variability models corresponding to the modified sub-phoneme HMM itself and a sub-phoneme whose spectrum is similar to that of the speech model sub-phoneme HMM to be modified. The acoustic-phonetic variability learn unit 50 modifies the spectrum of a sub-phoneme HMM of the normal speech model 7 in this manner more than once through the learning loop to generate an improved set of parameters representing the acoustic-phonetic variability model 8 before outputting it.

Thus, the spectrum smooth-modifier 22b generates an improved quality of a modified spectrum, which also improves the quality of the reference speech model in the reference speech model buffer 14, the quality of the segment data in the segmenter 15 avoiding distortion, and the quality of the acoustic-phonetic variability model 8 for recognition accuracy.

Embodiment 3

With reference to the previously discussed inventive speech recognition, a speech learning operation and a speech recognition operation may be separated. According to another embodiment of the present invention, a speech recognition is separated into speech learning and speech recognition operated separately in different apparatuses.

Figure 11:
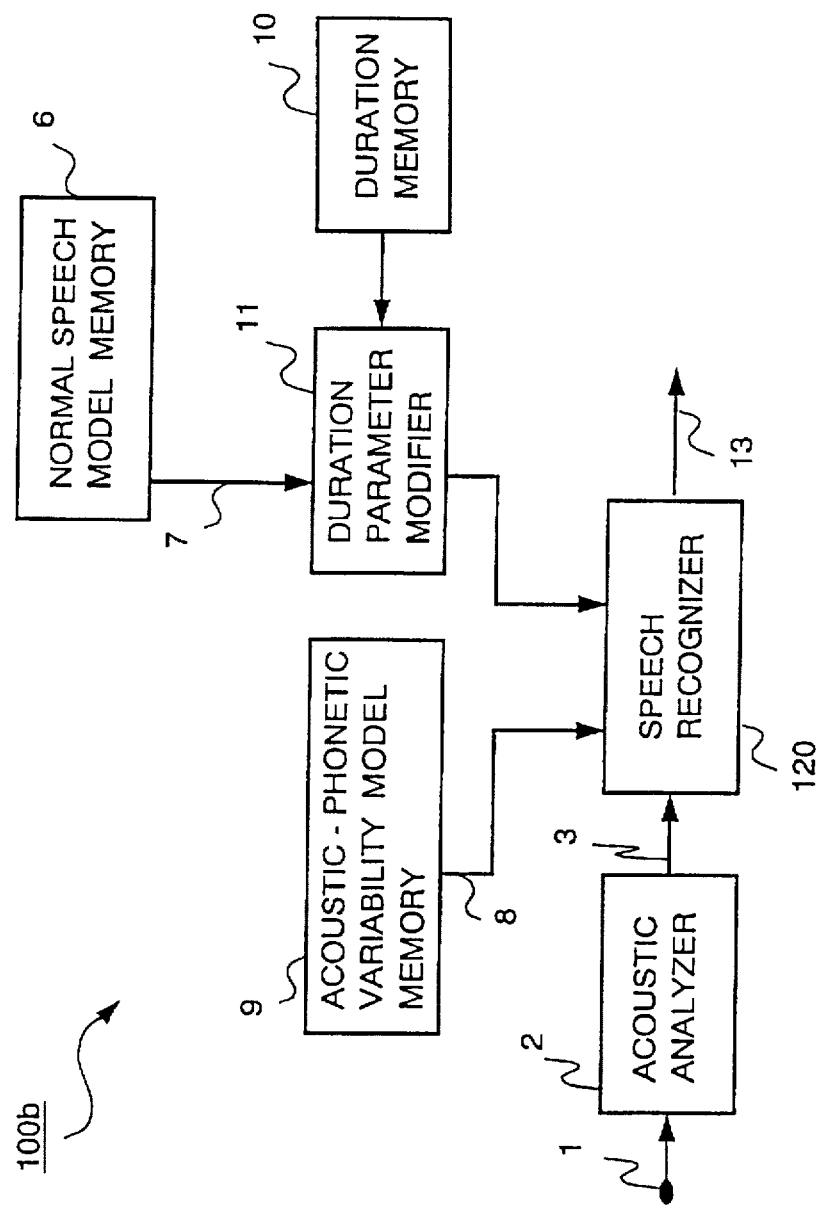
FIG. 11 is a block diagram of a speech recognition apparatus according to a third embodiment of the present invention.

FIG. 11 is a block diagram of a speech recognition apparatus 100b according to this embodiment. The embodiment of the speech recognition apparatus 100b modifies the embodiment of the speech recognition apparatus 100a of FIG. 9 with the removal of the transfer switch 4 and the acoustic-phonetic variability learn unit 50 of FIG. 9. The speech recognition apparatus 100b is dedicated to a recognition process for recognizing input words of utterance using the acoustic-phonetic variability models 8 stored in the acoustic-phonetic variability model memory 9. The acoustic-phonetic variability 8 is learned in an external speech learning apparatus.

Figure 12:
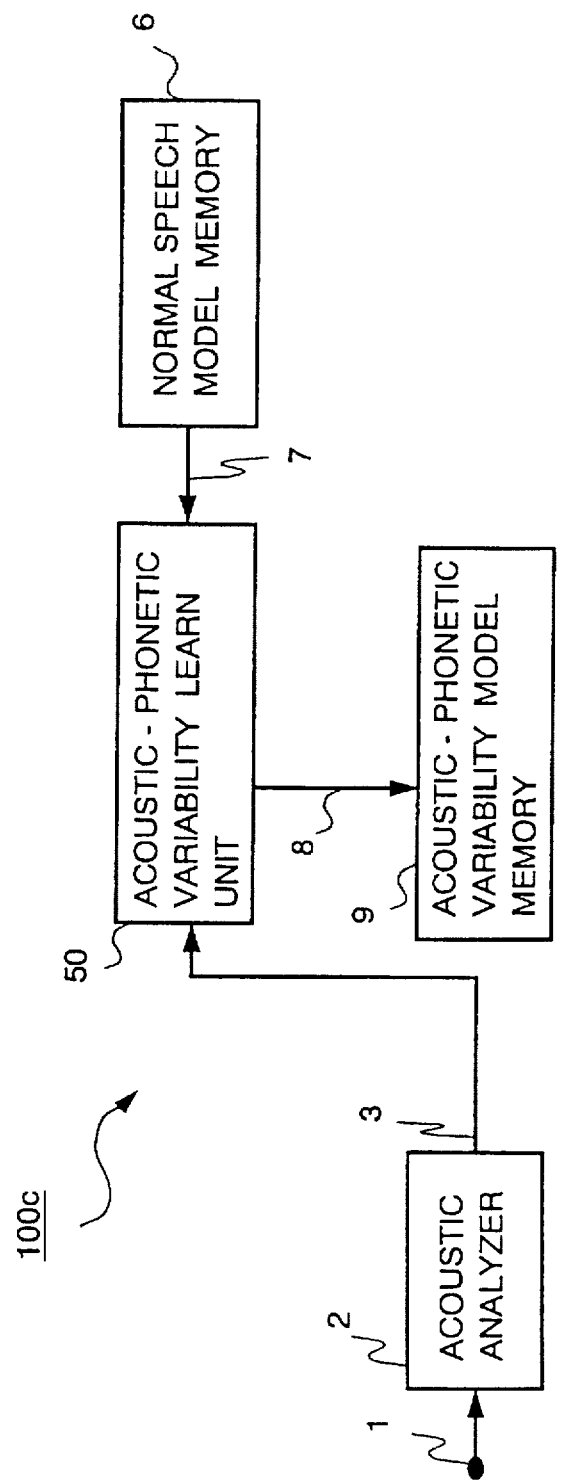
FIG. 12 is a block diagram of a speech learning apparatus according to the third embodiment.

FIG. 12 is a block diagram of a speech learning apparatus 100c according to this embodiment. The speech learning apparatus 100c modifies the speech recognition apparatus 100a of FIG. 9 with the removals of the switch 4, the duration memory 10, the duration parameter modifier 11, and the speech recognize unit 120 of FIG. 9. The speech learning apparatus 100c is dedicated to a learning process for generating the acoustic-phonetic variability models 8.

For an integrated operation of the speech recognition, the acoustic-phonetic variability models 8 may be generated in the speech learning apparatus 100c and provided for recognition in the speech recognition apparatus 100b by way of floppy disc or online transmission through a communication line.

Embodiment 4

Figure 13:
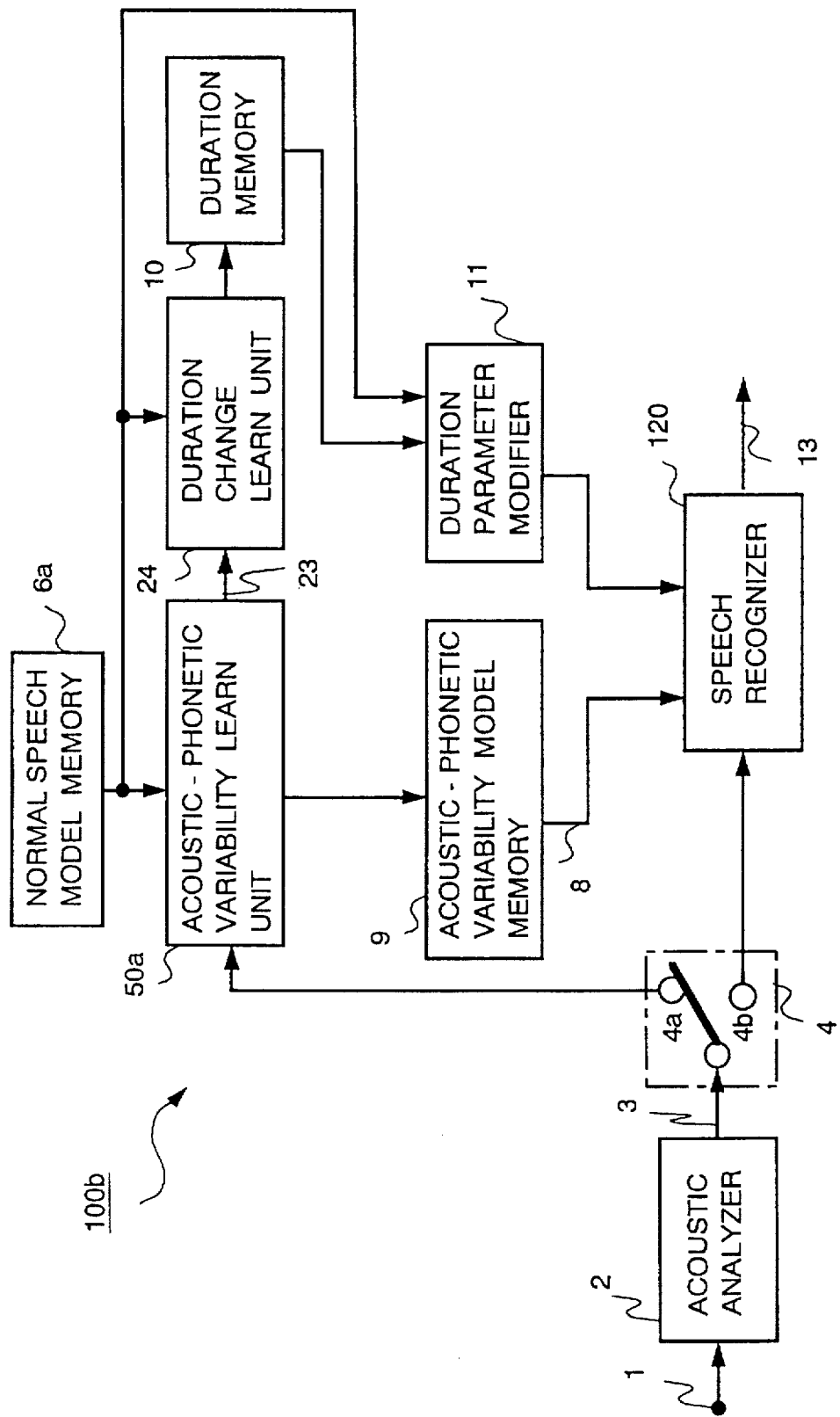
FIG. 13 is a block diagram of a speech recognition apparatus according to a fourth embodiment of the present invention.
Figure 14:
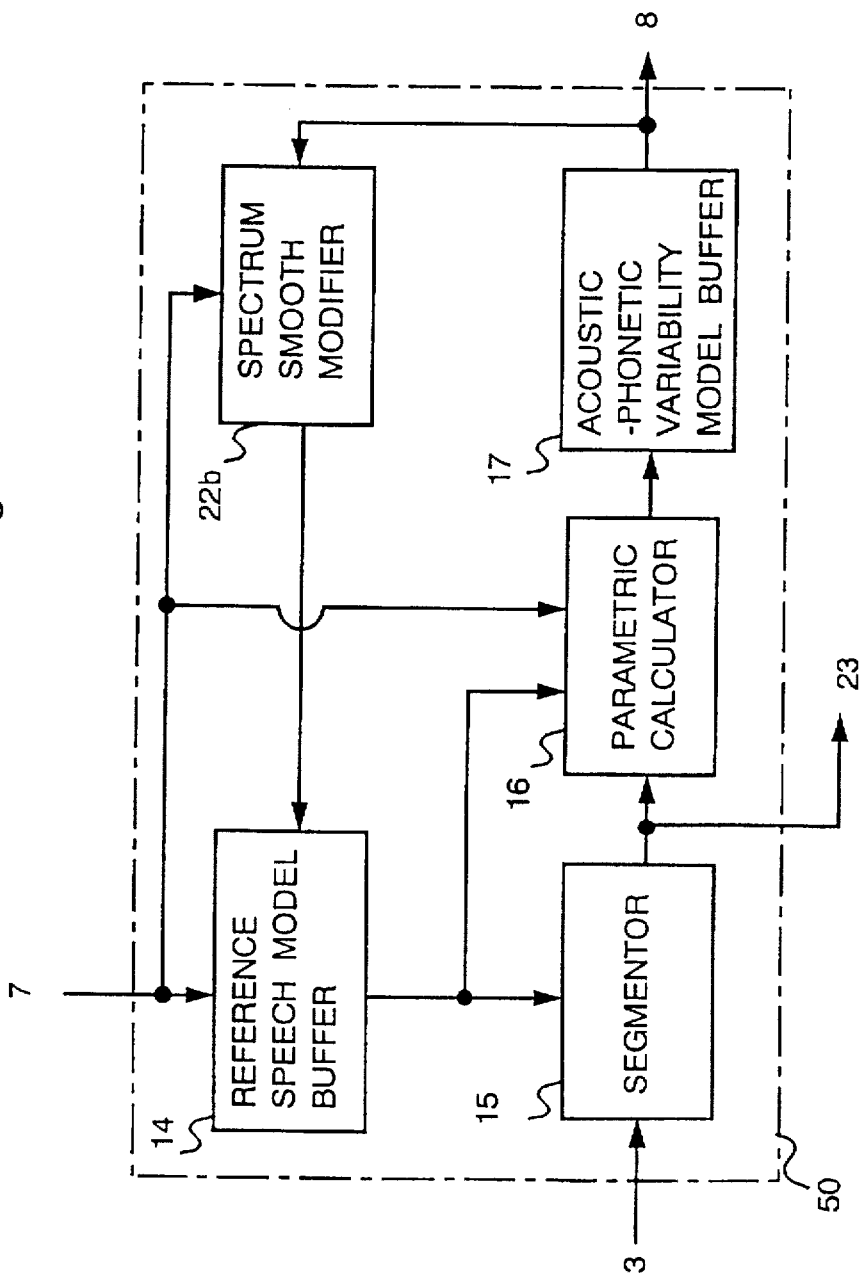
FIG. 14 is a detailed block diagram of the acoustic-phonetic variability learn unit in the speech recognition apparatus of FIG. 13.

FIG. 13 is a block diagram of a speech recognition apparatus 100d according to another embodiment of the present invention. The fourth embodiment of the speech recognition apparatus 100d modifies the embodiment of the speech recognition apparatus 100a of FIG. 9 with the replacement of an acoustic-phonetic variability generator 50a and a normal speech model memory 6a, respectively, for the acoustic-phonetic variability learn unit 50 and the normal speech model memory 6 of FIG. 9 and an additional duration change learn unit 24. The duration change learn unit 24 calculates sub-phoneme based duration change parameters based on the sub-phoneme based segment data from the acoustic-phonetic variability learn unit 50a and the normal speech model sub-phoneme HMMs stored in the normal speech model memory 6a. The segment data are of the time-series feature vector 3 of acoustic-phonetic variability learn data provided also for generating the parametric representations of the acoustic-phonetic variability model 8. The sub-phoneme based duration change parameters are input to the duration memory 10. FIG. 14 is a detailed block diagram of the acoustic-phonetic variability learn unit 50a. The acoustic-phonetic variability learn unit 50a modifies the acoustic-phonetic variability learn unit 50 of FIG. 10 with an additional transmission line 23 for the segment data input to the duration change learn unit 24. The normal speech model memory 6a stores 300 kinds, according to this embodiment, of sub-phoneme HMMs of the normal speech models 7 learned based on normal speech data, word models, each in a string of sub-phoneme HMMs, representing vocabulary words for recognition, and the duration parameters of the 300 kinds of sub-phoneme HMMs. FIG. 15 shows a chart of the normal speech models including the mean vectors, X1 through X300, and the duration parameters representing the average values, N1 through N300, and distribution values, δ1 through δ300, of the 300 kinds of the normal speech model sub-phoneme HMMs. The functional descriptions of the elements of FIG. 13 sharing the reference numerals with those in FIG. 9 will not be reiterated in detail here.

A discrete word recognition based on continuous density sub-phoneme HMM is now discussed according to this embodiment with reference to FIGS. 13 through 17. Operational descriptions of this embodiment that are equivalent to those of the conventional discrete word recognition based on continuous density sub-phoneme HMM discussed earlier will not be reiterated here.

A duration change learning operation in the duration change learn unit 24 is now discussed based on a normal sub-phoneme duration control. The sub-phoneme based segment data is input from the acoustic-phonetic variability learn unit 50a through the transmission line 23. Duration parameters of unnatural speech are calculated based on the segment data on a sub-phoneme basis. The unnatural sub-phoneme duration parameters of the segment data are compared with the normal sub-phoneme duration parameters of the normal speech model sub-phoneme HMM stored in the normal speech model memory 6a. Duration change data are calculated based on the comparison of normal and unnatural speech duration data and stored in the duration memory 10. FIG. 16 shows a chart of sub-phoneme duration change data listing the average values, ΔN1 through ΔN300, and distribution values, Δδ1 through Δδ300, of the 300 kinds of sub-phoneme HMMs.

The average values, ΔN1 through ΔN300, of the sub-phoneme duration change parameters may be represented by warping ratio, warping time or other means representing the average variations of duration changes by unnatural speech effect. The distribution values, Δδ1 through Δδ300, may also be represented by shifting ratio of distributions or standard deviations or other means representing distribution variations of the duration changes.

According to this embodiment, duration change data stored in the duration memory 10 are based on the same acoustic-phonetic variability learn data as that provided for generating the acoustic-phonetic variability model 8 in the acoustic-phonetic variability learn unit 50a. The speaker-dependent duration change data of this embodiment contribute to improved recognition accuracy.

Embodiment 5

With reference to the fourth embodiment, the duration change learn unit 24 may perform the parameter calculations limiting with sub-phoneme HMMs observed with considerable duration changes by unnatural speech effect. The stationary parts of the five vowels, /a/, /e/, /i/, /o/ and /u/, the first five sub-phoneme HMMs listed in the chart of duration change data of FIG. 16, and the transient parts of the vowels adjacent to word-tails have such an effect considerably, which is of Japanese language for example. Such a limited calculation for duration change data may lessen greatly the burden of the thorough calculation of duration change data with all of the 300 kinds of sub-phonemes.

Embodiment 6

With further reference to the fifth embodiment, the limited duration change data of the five vowels in the stationary parts and the transient parts adjacent to word-tails may be divided by five for averaging to provide common data to those parts as the following equations show:

$$\Delta N = \frac{\Delta N1 + \Delta N2 + \Delta N3 + \Delta N4 + \Delta N5}{5}$$

$$\Delta \delta = \frac{\Delta \delta 1 + \Delta \delta 2 + \Delta \delta 3 + \Delta \delta 4 + \Delta \delta 5}{5}$$

This can avoid a poor performance of recognition accuracy even provided with a smaller amount of acoustic-phonetic variability learn data.

Embodiment 7

With further reference to the previous embodiments, the inventive speech recognition may not be limited based only on continuous density sub-phoneme HMM and vocabulary words may not be the only possibility to be employed for recognition but continuous utterances of words or other phonological units may be employed.

Embodiment 8

With further reference to the previous embodiments, the duration control may not be based only on sub-phoneme but any of other phonological units such as phoneme, semi-syllable, syllable and word may be employed. Similarly, the acoustic-phonetic variability model may not only be defined on a sub-phoneme HMM basis but on any of phonological units basis. Otherwise, the acoustic-phonetic variability model may be defined based on a single HMM or a plurality of HMMs. The inventive speech recognition method may not only be hardware driven in a speech recognition system but also may be software driven.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A speech recognition apparatus comprising:

an acoustic analyzer for analyzing an input speech signal of unnatural speech and extracting a time-series feature vector from said input speech signal;

a normal speech model memory for storing a normal speech model learned based on normal speech data;

an acoustic-phonetic variability model memory for storing a plurality of acoustic-phonetic variability models, each representing an acoustic-phonetic change of spectrum caused by unnatural speech; and speech recognition means for generating an unnatural speech model based on said normal speech model and at least one of said plurality of acoustic-phonetic variability models corresponding to another of said normal speech models, for recognizing said input speech signal of unnatural speech based on said time-series feature vector and said unnatural speech model, and for outputting a recognition result.

2. The speech recognition apparatus of claim 1, wherein said speech recognition means generates said unnatural speech model based on said normal speech model and at least two of said plurality of acoustic-phonetic variability models.

3. The speech recognition apparatus of claim 2, wherein said speech recognition means comprises:

spectrum modifying means for modifying a spectrum of said normal speech model based on at least two of said plurality of acoustic-phonetic variability models and for generating a spectrum-modified speech model of said unnatural speech model;

a speech model synthesizer for synthesizing said spectrum-modified speech model and said normal speech model and for generating a synthesized speech model; and speech identifying means for calculating a similarity of said time-series feature vector based on said synthesized speech model and for outputting said recognition result based on said similarity.

4. The speech recognition apparatus of claim 3 further comprising:

speech learning means for learning said acoustic-phonetic change based on said time-series feature vector and said normal speech model and for generating said acoustic-phonetic variability model.

5. The speech recognition apparatus of claim 4, wherein said speech recognition apparatus processes Lombard speech including any forms of speech uttered in an unnatural environment and speech by the disabled.

6. A speech recognition apparatus comprising:

an acoustic analyzer for analyzing an input speech signal of unnatural speech and extracting a time-series feature vector from said input speech signal;

a normal speech model memory for storing a normal speech model learned based on normal speech data;

an acoustic-phonetic variability model memory for storing an acoustic-phonetic variability model representing an acoustic-phonetic change of spectrum caused by said unnatural speech; and speech learning means for learning said acoustic-phonetic change with said time-series feature vector based on said normal speech model and for generating said acoustic-phonetic variability model.

7. The speech recognition apparatus of claim 6, wherein said speech learning means further comprises:

a reference speech model buffer for buffering a reference speech model;

means for segmenting said time-series feature vector based on said reference speech model to generate segment data;

a parameter calculator for calculating a parametric representation of said acoustic-phonetic variability model of each segment data of said time-series feature vector based on said reference speech model and said normal speech model;

an acoustic-phonetic variability model buffer for buffering said acoustic-phonetic variability model; and spectrum modifying means for modifying a spectrum of said normal speech model based on a plurality of said parametric representations of said acoustic-phonetic variability models, for generating a spectrum-modified speech model and for outputting said spectrum-modified speech model to said reference speech model buffer.

8. The speech recognition apparatus of claim 7, further comprising:

speech recognition means for generating an unnatural speech model based on said normal speech model and a plurality of said acoustic-phonetic variability models, for recognizing said input speech signal of unnatural speech based on said time-series feature vector and said unnatural speech model, and for outputting a recognition result.

9. The speech recognition apparatus of claim 3 or 7, further comprising:

weight memory means for calculating a weight coefficient between one of said normal speech models and another of said normal speech models based upon spectral similarity, and for storing said weight coefficient;

wherein said spectrum modifying means includes means for selecting a plurality of said normal speech models having highest values of said weight coefficient with said spectrum, and means for modifying said spectrum based on said corresponding models of said acoustic-phonetic variability models.

10. The speech recognition apparatus of claim 9, wherein said weight memory means includes means for assigning a highest value of said weight coefficient to said one of said normal speech models when said one of said normal speech models and said another of said normal speech models are same models in said weight memory means.

11. The speech recognition apparatus of claim 10, wherein said spectrum modifying means comprises:
- a mean-value calculator for modifying said spectrum based on each of a plurality of said acoustic-phonetic variability models corresponding to said selected normal speech models, and for calculating a mean value of a plurality of said modified spectra of said normal speech model.

12. The speech recognition apparatus of claim 11, wherein said mean-value calculator calculates said mean value based on said weight coefficient.

13. The speech recognition apparatus of claim 3 or 7, wherein said spectrum modifying means includes means for modifying a spectrum of a learned one of said normal speech models based on a corresponding one of said acoustic-phonetic variability models to said learned one of said normal speech models and at least another of said acoustic-phonetic variability models.

14. The speech recognition apparatus of claim 3 or 7, wherein said spectrum modifying means includes means for modifying a spectrum of an unlearned one of said normal speech models based on a plurality of said acoustic-phonetic variability models.

15. A speech recognition apparatus, comprising:
- an acoustic analyzer for analyzing an input speech signal of unnatural speech and extracting a time-series feature vector from said input speech signal;
- a normal speech model memory for storing a normal speech model learned based on normal speech data;
- speech learning means for learning an acoustic-phonetic change based on said time-series feature vector and said normal speech model and for generating an acoustic-phonetic variability model based upon said acoustic-phonetic change;
- duration change learning means for learning a duration change by unnatural speech on a phonological unit basis based on said acoustic-phonetic variability model and said normal speech model, and for generating duration change data based upon said duration change; and
- a duration memory for storing said duration change data.

16. The speech recognition apparatus of claim 15, further comprising:
- an acoustic-phonetic variability model memory for storing a plurality of acoustic-phonetic variability models, each representing an acoustic-phonetic change of spectrum caused by unnatural speech;
- a duration parameter modifier for modifying a parametric representation of normal duration of said normal speech model stored in said normal speech model memory based on said duration change data to generate a parameter-modified normal speech model; and
- speech recognition means for generating an unnatural speech model based on said normal speech model and at least one of said plurality of acoustic-phonetic variability models corresponding to another of said normal speech models, for recognizing said input speech signal of unnatural speech based on said time-series feature vector and said unnatural speech model, and for outputting a recognition result.

17. The speech recognition apparatus of claim 15, wherein said speech recognition means generates said unnatural speech model based on said normal speech model and at least two of said plurality of acoustic-phonetic variability models.

18. The speech recognition apparatus of claim 15, wherein said duration change learning means includes means for learning a duration change observed from a vowel.

19. The speech recognition apparatus of claim 15, wherein said duration change learning means includes means for learning said duration change observed with five vowels of /a/, /e/, /i/, /o/ and /u/ and for calculating a mean value of said duration changes obtained from at least two of said five vowels.

20. A speech recognition method, comprising the steps of:
- storing a plurality of normal speech models, a plurality of acoustic-phonetic variability models corresponding to some of said plurality of normal speech models, and a plurality of values of weight coefficients, each representing a similarity of one of said plurality of normal speech models to another of said plurality of normal speech models;
- selecting a selected plurality of said acoustic-phonetic variability models having highest values of said weight coefficient with one of said normal speech models, modifying a spectrum of said one of normal speech models based on each one of said selected plurality of acoustic-phonetic variability models, and generating a plurality of modified spectra of said one of said normal speech models;
- calculating a mean value of said plurality of modified spectra to generate a modified normal speech model based on said mean value; and
- comparing said mean value modified normal speech model with input unnatural speech data and outputting a comparison result.

21. The speech recognition method of claim 20, further comprising a step of recognizing unnatural speech based on said comparison result.

22. The speech recognition method of claim 20, further comprising a step of learning based on said comparison result.

23. A speech recognition method, comprising the steps of:
- analyzing an input speech signal to extract a time-series feature vector from said input speech signal;
- learning normal speech data, generating a normal speech model including a duration parameter, and storing said normal speech model;
- learning an acoustic-phonetic variability model representing an acoustic-phonetic change of spectrum caused by unnatural speech based on said normal speech model and said time-series feature vector;
- calculating a duration change by unnatural speech on a phonological unit basis based on said normal speech model and said acoustic-phonetic variability model, and storing duration change data;
- modifying said duration parameter of said normal speech model based on said duration change data, and generating a parameter-modified normal speech model; and
- recognizing said time-series feature vector based on said parameter-modified normal speech model and said acoustic-phonetic variability model, and outputting a recognition result.

24. A speech recognition apparatus for recognizing an input utterance having an acoustic-phonetic change of spectrum caused by unnatural speech, said speech recognition apparatus comprising:

an acoustic analyzer for extracting a feature vector from said input utterance;

a normal speech data memory for providing a learning result of normal speech data;

a memory for providing a learning result of said acoustic-phonetic change; and a speech recognition unit having an input that receives said feature vector and an output that provides a recognition result, said speech recognition unit comprising:

means for modifying said learning result off normal speech data based on at least one of said learning results of acoustic-phonetic change and for generating a modified speech model based on said acoustic-phonetic change, said at least one of said learning results of acoustic-phonetic change may not correspond to said learning result of normal speech model.

25. The speech recognition apparatus of claim 24, wherein:

said learning result of normal speech data is a normal speech model on a phonological unit basis; and said learning result of said acoustic-phonetic change is an acoustic-phonetic variability model on said phonological unit basis.

26. The speech recognition apparatus of claim 25, wherein said speech recognition unit further comprises:

means for generating a reference speech model based on said modified speech model; and a recognizer for recognizing said input utterance based on said feature vector and said reference speech model.

27. The speech recognition apparatus of claim 26, wherein said means for generating the reference speech model includes a synthesizer for synthesizing said modified speech model and said normal speech model to generate a synthesized speech model as said reference speech model.

28. The speech recognition apparatus of claim 26, wherein said recognizer comprises:

means for calculating decision data based on said feature vector and said reference speech model; and an identifier for identifying said input utterance based on said decision data.

29. The speech recognition apparatus of claim 28, wherein said means for calculating includes means for calculating a similarity between said feature vector and said reference speech model to generate similarity data as said decision data.

30. The speech recognition apparatus of claim 25, wherein said normal speech data memory has an output that provides a recognition vocabulary in a string of said normal speech models for recognition.

31. The speech recognition apparatus of claim 30, wherein said identifier has an output that identifies said input utterance based on comparison of said decision data to said recognition vocabulary.

32. The speech recognition apparatus of claim 31, further comprising:

a transfer switch including a learn mode and a recognize mode, for transferring said feature vector to said speech learning unit when said learn mode switch is in the learn mode, and for transferring said feature vector to said speech learning unit to said speech recognition unit when said learn mode switch is in the recognize mode.

33. The speech recognition apparatus of claim 25, wherein each acoustic-phonetic variability model includes parameters representing changes in a spectral envelope of input speech caused by unnatural speech.

34. A speech recognition apparatus comprising:

an acoustic analyzer for extracting a feature vector from an input utterance;

a normal speech data memory for providing a learning result of normal speech data; and a speech learning unit including:

means for learning an acoustic-phonetic change of spectrum caused by unnatural speech to generate a learning result; and means for modifying said learning result of normal speech data based on at least one of said learning result of said acoustic-phonetic change to generate a reference speech model.

35. The speech recognition apparatus of claim 34, wherein said learning result of normal speech data is a normal speech model on a phonological unit basis and said learning result of said acoustic-phonetic change is an acoustic-phonetic variability model on said phonological unit basis.

36. The speech recognition apparatus of claim 35, wherein said speech learning unit further comprises:

means for calculating a parameter of spectral change of said feature vector based on said reference speech model and said normal speech model and for generating a parametric representation of said acoustic-phonetic variability model.

37. The speech recognition apparatus of claim 36, wherein said speech learning unit further comprises:

a first buffer for buffering and outputting said acoustic-phonetic variability model to said modifying means during an execution of a learning loop performed by said means for learning and for buffering and outputting said acoustic-phonetic variability model output from said speech learning unit at an end of said learning loop.

38. The speech recognition apparatus of claim 36, wherein said speech learning unit further comprises:

means for segmenting said feature vector based on said reference speech model, for generating segmented data and for providing said segmented data for said parametric calculation.

39. The speech recognition apparatus of claim 38, wherein said speech learning unit further comprises:

a second buffer for buffering and outputting said reference speech model to said segmenting means for generating said segmented data of said feature vector and to said calculating means for said parametric calculation.

40. The speech recognition apparatus of claim 38, wherein said normal speech data memory further provides normal duration data learned and stored based on normal speech data; and wherein said segmenting means outputs said segment data during an execution of a learning loop performed by said means for learning;

said speech recognition apparatus further comprising: a duration change learn unit for learning a duration change of said input utterance based on said segment data and said normal duration data.

* * * * *

UNITED STATES PATENT AND TRADEMARK OFFICE
CERTIFICATE OF CORRECTION

PATENT NO. : 5,742,928
DATED : April 21, 1998
INVENTOR(S) : Tadashi Suzuki

It is certified that error appears in the above-identified patent and that said Letters Patent is hereby corrected as shown below:

Column 23, line 11 change "result off" to -- result of --.

Signed and Sealed this

Twenty-ninth Day of September, 1998

Attest:

BRUCE LEHMAN

Attesting Officer                Commissioner of Patents and Trademarks